United States Patent [19]
Kawasaki et al.

[11] Patent Number: 5,513,056
[45] Date of Patent: Apr. 30, 1996

[54] MAGNETIC HEAD SLIDER

[75] Inventors: Mikio Kawasaki, Kumamoto City; Takahiro Ohmori, Tamana; Hiroshi Tomiyasu, Kamoto, all of Japan

[73] Assignee: Matsushita Electric Industrial Co., Ltd., Osaka, Japan

[21] Appl. No.: 213,331

[22] Filed: Mar. 15, 1994

[30] Foreign Application Priority Data

Mar. 18, 1993 [JP] Japan ................................ 5-058224

[51] Int. Cl.$^6$ ........................................ G11B 5/60
[52] U.S. Cl. ........................................ 360/103
[58] Field of Search ................................ 360/103

[56] References Cited

U.S. PATENT DOCUMENTS

| | | | |
|---|---|---|---|
| 3,823,416 | 7/1974 | Warner | 360/103 |
| 4,673,996 | 6/1987 | White | 360/103 |
| 4,894,740 | 1/1990 | Chhabra et al. | 360/103 |
| 5,396,387 | 3/1995 | Murray | 360/103 |

*Primary Examiner*—Robert S. Tupper
*Attorney, Agent, or Firm*—Panitch Schwarze Jacobs & Nadel

[57] ABSTRACT

A magnetic head slider (1) has a first rail (20) with a first air bearing surface, a second rail (25) with a second air bearing surface and further a third rail (15) with a third air bearing surface. The third rail is formed between the first rail (20) and the second rail (25). On both sides of the third air bearing surface (16), a first air pressurization part (17) and a second air pressurization part (18) are formed sunk by respective depths. When the skew angle "θ" occurs, appropriate pressurized air flows are generated by the first air pressurization part (17) and the second air pressurization part (18) to compensate for the lifting force.

10 Claims, 21 Drawing Sheets

MAGNETIC HEAD SLIDER

FIELD OF THE INVENTION AND RELATED ART STATEMENT

1. Field of the Invention

The present invention relates to a magnetic head slider which is to be used in rigid magnetic disk drives or the like.

2. Description of the Prior Art

In recent years, rigid magnetic disk drives as external magnetic recording systems of the electronic computers are widely used because of high speed recording/reading and large capacity memories. And rigid magnetic disk drives having larger capacity memories are increasingly demanded with small size. Accordingly, it is necessary to increase BPI (Bit Per Inch) of a magnetic disk for high recording density of the rigid magnetic disk drives. The increase of BPI is accomplished by reducing a wavelength of a recorded information. Therefore, in order to reduce the wavelength, there has been the following requests in rigid magnetic disk drives:

1. A length of a magnetic gap is made smaller.
2. A distance between the magnetic gap and the magnetic disk (hereinafter referred to as a flying height) is made shorter.

However, in a low flying height, the magnetic head slider (hereinafter referred to as a slider) is liable to come in contact with the magnetic disk. Thereby, there is a fear that the recorded information on the magnetic disk is broken down. Accordingly, in the slider, it is demanded to maintain the low flying height of its surface constantly without a fluctuation of the slider.

FIG. 16A is a perspective view of a conventional magnetic head having a tapered flat slider which is described in U.S. Pat. No. 3,823,416. FIG. 16B is a plan view of the conventional magnetic head shown in FIG. 16A seen from the magnetic disk.

In FIG. 16A and FIG. 16B, a magnetic head 100 comprises the tapered flat slider 101 and a magnetic transducer 130. In the tapered flat slider 101, a first rail 120 and a second rail 125 are provided on a surface 102, which faces to the magnetic disk, so as to extend from the front end 103 of the surface 102 to the rear end 104 of the surface 102, respectively.

Subsequently, the first rail 120 comprises a first air bearing surface 121 and a first tapered part 122 having a predetermined angle to the first air bearing surface 121. Similarly, the second rail 125 comprises a second air bearing surface 126 and a second tapered part 127 having the predetermined angle to the second air bearing surface 126. And a slot part 105 is provided between the first rail 120 and the second rail 125 in the surface 102.

Subsequently, the magnetic transducer 130 having two magnetic gaps 131 is fixed at the rear end 104 of the tapered flat slider 101 so that one of the magnetic gaps 31 is disposed on a coplanar of the first air bearing surface 121 and the other of the magnetic gaps 131 is disposed on a coplanar of the second air bearing surface 26.

In such conventional magnetic head 100 applying the tapered flat slider 101, dispositions of the magnetic gaps 131 are symmetrical and apart from a central axis for supporting the magnetic head 100. Therefore, there was a problem that the magnetic gaps 131 were easily come in contact with the magnetic disk at rolling of the magnetic head 100 in low flying height. Furthermore, when this magnetic head 100 were of small size for obtaining the low flying height, there was further problem that tolerances to pitching and rolling of the magnetic head 100 become small.

As one of improvements of the above-mentioned problems, a tri-rail slider described in U.S. Pat. No. 4,894,740 was used for the magnetic head. FIG. 17A is a perspective view having a conventional magnetic head of the tri-rail slider. FIG. 17B is a plan view of the conventional magnetic head shown in FIG. 17A seen from the magnetic disk.

In FIG. 17A and FIG. 17B, a magnetic head 200 comprises the tri-rail slider 201 and a magnetic transducer 230. In the tri-rail slider 201, a first rail 220 and a second rail 225 are provided on a surface 202, which face to the magnetic disk, so as to extend from the front end 203 of the surface 202 toward the rear end 204 of the surface 202, respectively. Furthermore, a third rail 215 is provided on the surface 202 between the first rail 220 and the second rail 225 so as to extend from the front end 203 to the rear end 204.

The first rail 220 comprises a first air bearing surface 221 and a first tapered part 222 having a predetermined angle to the first air bearing surface 221. Furthermore, a width of the first air bearing surface 221 at the side of the front end 203 is larger than a width thereof at the side of the rear end 204. Similarly, the second rail 225 comprises a second air bearing surface 226 and a second tapered part 227 having the predetermined angle to the second air bearing surface 226. A width of the second air bearing surface 226 at the side of the front end 203 is larger than a width thereof at the side of the rear end 204. The third rail 215 comprises a third air bearing surface 216 and a third tapered part 217 having the predetermined angle to the third air bearing surface 216. Furthermore, a width of the third air bearing surface 216 at the side of the front end 203 is smaller than a width thereof at the side of the rear end 204.

A first slot part 205 is provided between the first rail 220 and the third rail 215 in the surface 202, and a second slot part 206 is provided between the second rail 225 and the third rail 215 in the surface 202. Furthermore, depths of the first slot part 205 and the second slot part 206 are generally more than 10 μm, respectively.

The magnetic transducer 230 having a magnetic gap 231 is fixed at the rear end 204 so that the magnetic gap 231 is disposed on a coplanar of the third air bearing surface 216.

A flying characteristic of the magnetic head 200 will be explained with reference to FIG. 18, which is a graph showing pressure profiles, obtained by rails 215, 220 and 225 of the tri-rail slider 201 shown in FIG. 17A along the positions between the front end 203 and the rear end 204.

In FIG. 18, a solid line curve 84 shows a pressure profile obtained by the first rail 220 or the second rail 225, and a broken line curve 85 shows a pressure profile obtained by the third rail 215. As shown in the solid line curve 84, the pressure profile obtained by the first rail 220 or the second rail 225 has a high pressure peak near the front end 203 and decreases toward the rear end 204. On the other hand, as shown in the broken line curve 85, the pressure profile obtained by the third rail 215 has lower pressure near the front end 203 and higher pressure peak near the rear end 204. Thereby, a pressure profile obtained by the tri-rail slider 201 has the high pressure near the front end 203, the comparatively lower pressure in the middle of the tri-rail slider 201, and the comparatively higher pressure near the rear end 204. Since the magnetic gap 231 is disposed at the end of the third rail 215, when the magnetic head 200 is of small size, the flying height becomes stable against pitching and rolling of the magnetic head 200.

However, a rotary type actuator has been used mainly for rigid magnetic disk drives to reduce size of rigid magnetic disk drives. In the slider supported by this rotary type actuator, a skew angle "θ", which is defined as an angle between an air flow and a longitudinal axis of the slider, changes in accordance with the movement of the rotary type actuator. Therefore, a problem arises that the flying height makes a change. FIG. 14A is an explanatory drawing of motion of the rigid magnetic disk drives applying the rotary type actuator. FIG. 14B, FIG. 14C and FIG. 14D are explanatory drawings of the skew angle "θ" at points "B", "C" and "D" shown in FIG. 14A, respectively.

In FIG. 14A, a rotary type actuator 501 comprises a driving arm 502 and a suspension 503 supporting the tapered flat slider 101, and rotatably moves between point "B" and point "D" below a magnetic disk 500 rotating in the direction of arrow "A" shown in FIG. 14A so that the surface 102 of the tapered flat slider 101 (FIG. 16B) faces to the magnetic disk 500. Therefore, the skew angle "θ" changes in accordance with the movement of the rotary type actuator 501 as shown in FIG. 14B, FIG. 14C and FIG. 14D.

Change of the flying height when the skew angle "θ" makes a change from zero degree angle will be explained with reference to FIG. 14B, FIG. 14C and FIG. 14D.

As shown in FIG. 14C, when an air flow 504 blows against the tapered flat slider 101 in a direction parallel with a longitudinal axis 106 of the tapered flat slider 101, the skew angle "θ" is zero. Therefore, the air flow 504 is pressurized with the first tapered part 122 and the second tapered part 127, and the pressurized air flows give enough lifting forces to the first and the second air bearing surface 121 and 126, respectively.

Secondary, let us explain the case when the air flow 504 blows against the tapered flat slider 101 with a skew angle "θ3" as shown in FIG. 12B. In this case, the pressurized air flows slip off the first and the second air bearing surface 121 and 126, before giving enough lifting forces to the first and the second air bearing surface 121 and 126. Therefore, reduction of the flying height is induced. Furthermore, lifting forces at the right side part of the first air bearing surface 121 becomes larger than lifting forces at the left side part of the first air bearing surface 121, and lifting forces at the right side part of the second air bearing surface 126 becomes larger than lifting forces at the left side part of the second air bearing surface 126. Therefore, the imbalance of lifting forces leads to rolling of the tapered flat slider 101.

Thirdly, explanation is given for the case when the air flow 504 blows against the tapered flat slider 101 with a skew angle "θ4" as shown in FIG. 14D. In this case, the pressurized air flows slip off the first and the second air bearing surface 121 and 126, before giving enough lifting forces to the first and the second air bearing surface 121 and 126. Therefore, reduction of the flying height is induced. Furthermore, lifting forces at the left side part of the first air bearing surface 121 becomes larger than lifting forces at the right side part of the first air bearing surface 121, and lifting forces at the left side part of the second air bearing surface 126 becomes larger than lifting forces at the right side part of the second air bearing surface 126. Therefore, the imbalance of lifting forces leads to rolling of the tapered flat slider 101.

Apart from the aforementioned explanation in FIG. 14A, FIG. 14B, FIG. 14C and FIG. 14D, where the tapered flat slider 101 is supported by the rotary type actuator 501, an alternative configuration may be such that the tri-rail slider 201 is supported by the rotary type actuator 501.

As the skew angle "θ" becomes larger, the flying height becomes smaller. The skew angle "θ3" and the skew angle "θ4" are generally less than 15 degree angle. Furthermore, since lifting forces change responding to relative velocity between the magnetic disk and the slider, the flying height is determined by the skew angle "θ" and the relative velocity.

Now, flying characteristic will be shown in FIG. 15, which is a graph showing change of the flying height obtained from a computer simulation between points "B" and "D" shown in FIG. 14A.

In FIG. 15, a solid line curve 80 shows change of the flying height of the tapered flat slider 101, and a solid line curve 81 shows change of the flying height of the tri-rail slider 201. In this computer simulation, the following parameters are given as basic conditions:
(1) Diameter of the magnetic disk =3.5 inch,
(2) Revolution speed of the magnetic disk =5400 r.p.m.,
(3) Angles of the skew angle "θ3" and the skew angle "θ4" are 13.1 degree angle,
(4) Load for a center of the slider toward the magnetic disk =3 gram.

Furthermore, in the solid line curve 80, each length of the tapered flat slider 101 as shown in FIG. 16B are as follows:

L11=2.0 mm, W11=1.5 mm.

In the solid line curve 81, each length of the tri-rail slider 201 as shown in FIG. 17B are as follows:

L21=2.5 mm, W21=1.5 mm.

Though the slider is required to hold the flying height constantly, in the tapered flat slider 101 and the tri-rail slider 201, the flying height makes a change as shown in the solid line curves 80 and 81.

In order to dissolve the aforementioned problem, a transverse pressurization contours slider (hereinafter referred to as a TPC slider) described in U.S. Pat. No. 4,673,996 is used for the magnetic head. FIG. 19A is a perspective view having a conventional magnetic head of the TPC slider. FIG. 19B is a plan view of the conventional magnetic head shown in FIG. 19A seen from the magnetic disk.

In FIG. 19A and FIG. 19B, a magnetic head 300 comprises the TPC slider 301 and a magnetic transducer 330. In the TPC slider 301, a first rail 320 and a second rail 325 are provided on a surface 302, which faces to the magnetic disk, so as to extend from the front end 303 of the surface 302 to the rear end 304 of the surface 302, respectively.

The first rail 320 comprises a first air bearing surface 321 and a first tapered part 322 having the predetermined angle to the first air bearing surface 321. Furthermore, a first air pressurization part 350 is provided on one side of the first rail 320, and a second air pressurization part 351 is provided on the other side of the first rail 320. Similarly, the second rail 325 comprises a second air bearing surface 326 and a second tapered part 327 having the predetermined angle to the second air bearing surface 326. Furthermore, a third air pressurization part 352 is provided on one side of the second rail 325, and a fourth air pressurization part 353 is provided on the other side of the second rail 325.

A slot part 305 is formed between the second air pressurization part 351 and the third air pressurization part 352 in the surface 302. Furthermore, a depth of the slot part 305 are generally more than 10 μm. Additionally, in the first air pressurization part 350 and the second air pressurization part 351, a depth from the air bearing surface 321 is generally about 1 μm. Similarly, in the third air pressurization part 352 and the fourth air pressurization part 353, a depth from the air bearing surface 326 is generally about 1 μm.

The magnetic transducer 330 having two magnetic gaps 331 is fixed at the rear end 304 of the TPC slider 301 so that one of the magnetic gaps 331 is disposed on a coplanar of the first air bearing surface 321 and the other of the magnetic gaps 331 is disposed on a coplanar of the second air bearing surface 326.

In the first rail 320, when the skew angle "θ" becomes larger, the first air pressurization part 350 or the second air pressurization 351 pressurizes the air flow, respectively. Similarly, in the second rail 325, when the skew angle "θ" becomes larger, the third air pressurization part 352 or the fourth air pressurization 353 pressurizes the air flow, respectively. Therefore, even if the skew angle "θ" becomes larger, the lifting Forces are given to the first and the second rails 320 and 325, and reduction of the flying height is not raised up.

Now, in FIG. 15, a solid line 82 shows change of the flying height obtained from the computer simulation on the aforementioned basic conditions. Furthermore, in this computer simulation, lengths of the TPC slider 301 as shown in FIG. 19B are as follows:

L31=2.0 mm, W31=1.5 mm, W32=W33=158 μm, W34=W36=125 μm, W35=W37=60 μm

And in the first air pressurization part 350 and the second air pressurization part 351, a depth from the air bearing surface 321 is 1 μm. Similarly, in the third air pressurization part 352 and the fourth air pressurization part 353, a depth from the air bearing surface 326 is 1 μm.

As shown in the solid line 82, the flying height of the TPC slider 301 is a constant height between points "B" and "D" shown in FIG. 14A, and the flying characteristic of the TPC slider 301 is more excellent as compared with the tapered flat slider 101 and the tri-rail slider 201.

However, in this TPC slider 301, since stiffness of an air film formed between the surface 302 and the magnetic disk is smaller than that of the tapered flat slider 101, there are belowmentioned problems. When the TPC slider 301 receives a disturbance of the air flow induced by a seek motion or the like, the flying height makes a large change. Therefore, in the low flying height which is less than 0.1 μm, there is a problem that the recorded information on the magnetic disk is broken down by contact of the TPC slider 301 to the magnetic disk. More particularly, when the TPC slider 301 becomes to a smaller size, there is a problem that the flying height becomes astable against pitching and rolling of the magnetic head 300.

Furthermore, as shown in FIG. 19B, the first air pressurization part 350 is provided on the outside of the first air bearing surface 321, and the fourth air pressurization part 353 is provided on the outside of the second air bearing surface 326. Accordingly, a difference between the center of the gravity of the TPC slider 301 and the center of the lifting force in the widthwise direction of the TPC slider 301 exists in large condition. Therefore, there is a problem that stability against rolling of the TPC slider 301 is lowered.

In order to relieve the problem, it is preferred to narrow the widths of the first air pressurization part 350 and the fourth air pressurization part 353.

However, when the widths are narrowed, it is necessary to compensate reduction of the lifting force induced by the narrowed widths of the first air pressurization part 350 and the fourth air pressurization part 353. Thereby, the depths of the first air pressurization part 350 and the fourth air pressurization part 353 from the first air bearing surface 321 and the second air bearing surface 326 are required to become lower, respectively. Therefore, high fabrication precision is required in manufacturing of the TPC slider 301 in order to maintain an excellent flying characteristic, and there are problems that fabrication methods are limited, and manufacturing costs increase.

OBJECT AND SUMMARY OF THE INVENTION

The object of the present invention is to provide a magnetic head slider that can solve the aforementioned problems.

In order to achieve the above object, a magnetic head slider in accordance with the present invention comprises:

a surface facing to a magnetic disk with a predetermined pitch angle.

a first rail having a first air bearing surface and disposed on the surface in a manner to extend from a front end of the surface toward a rear end of the surface, a second rail having a second air bearing surface and disposed on the surface in a manner to extend from the front end toward the rear end, and a third rail having a third air bearing surface, at least one air pressurization part and disposed on the surface between the first rail and the second rail, the at least one air pressurization part is sunk by a depth from the third air bearing surface.

In the magnetic head slider of the present invention, the third rail is formed between the first rail and the second rail, and the third air bearing surface is disposed between the first air pressurization part having the first depth and the second air pressurization part having the second depth. Therefore, when the skew angle "θ" changes to zero degree angle to some value, the first air pressurization part or the second air pressurization part pressurize the air flow in order to compensate reduction of the lifting force. Accordingly, the flying height does not make a change even if the skew angle "θ" makes changes as shown in FIG. 14B and FIG. 14D from zero degree angle to some value.

Furthermore, since the first air pressurization part and the second air pressurization part are provided with the third rail, the flying height maintains constant value, and high stability against rolling and pitching is achieved. Thereby, the first depth and the width of the first air pressurization part and also the second depth and the width of the second air pressurization part can be made larger. Therefore, it is possible to lower the requirement on fabrication precision of the slider, and hence the manufacturing costs.

DESCRIPTION OF THE PREFERRED EMBODIMENTS

Hereafter preferred embodiments of a magnetic head slider of the invention are described with reference to the accompanying drawings.

FIRST EXAMPLE

Figure 1:
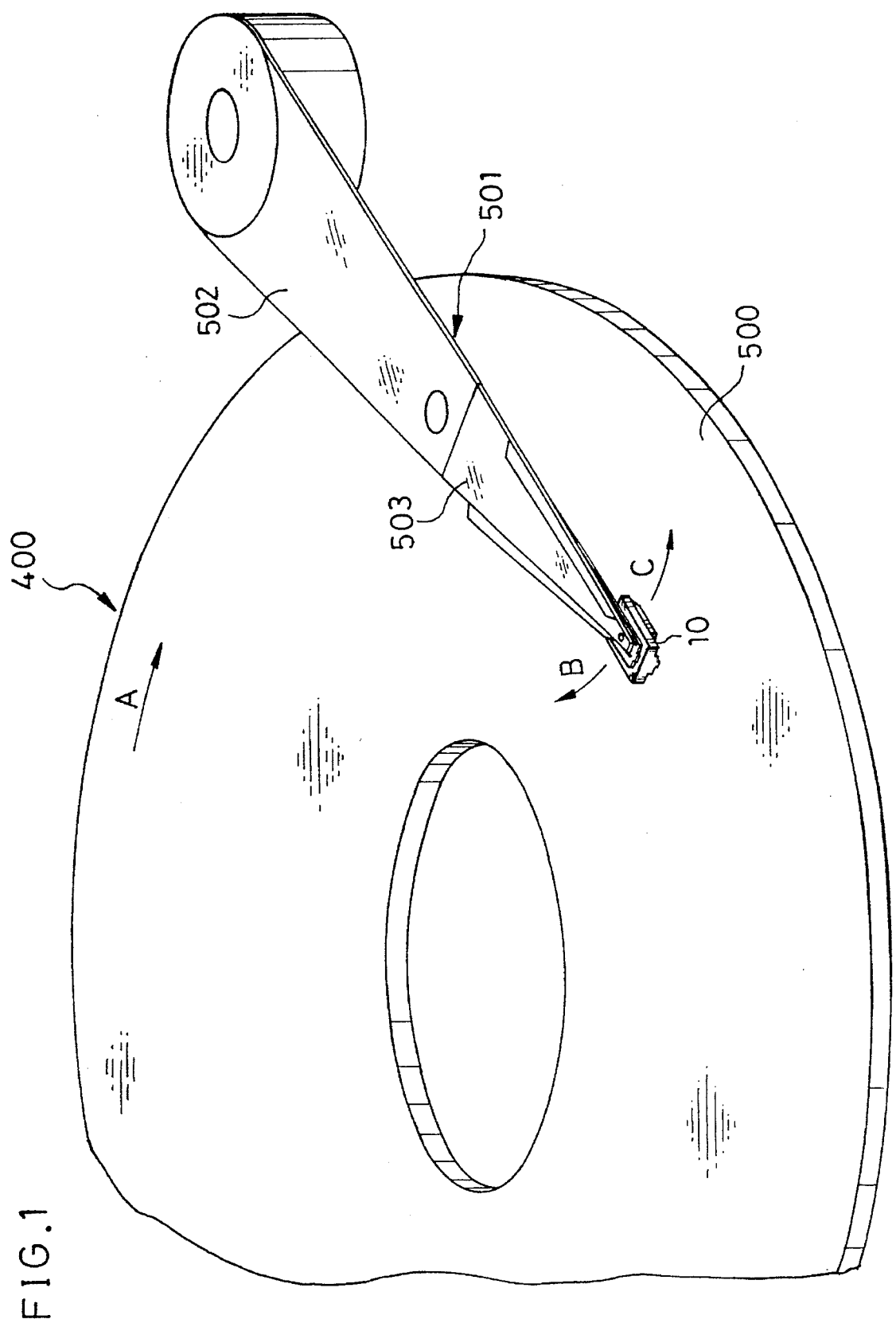
FIG. 1 is a perspective view of rigid magnetic disk drives.
Figure 2A:
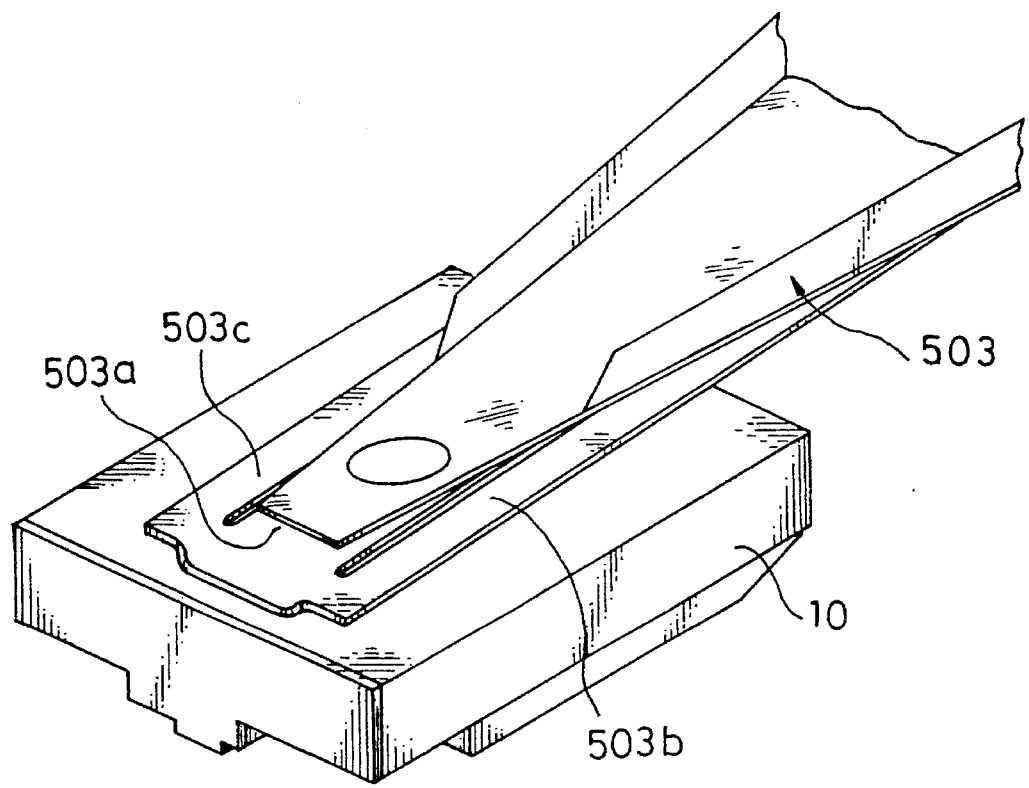
FIG. 2A is a perspective view of a magnetic head.
Figure 2B:
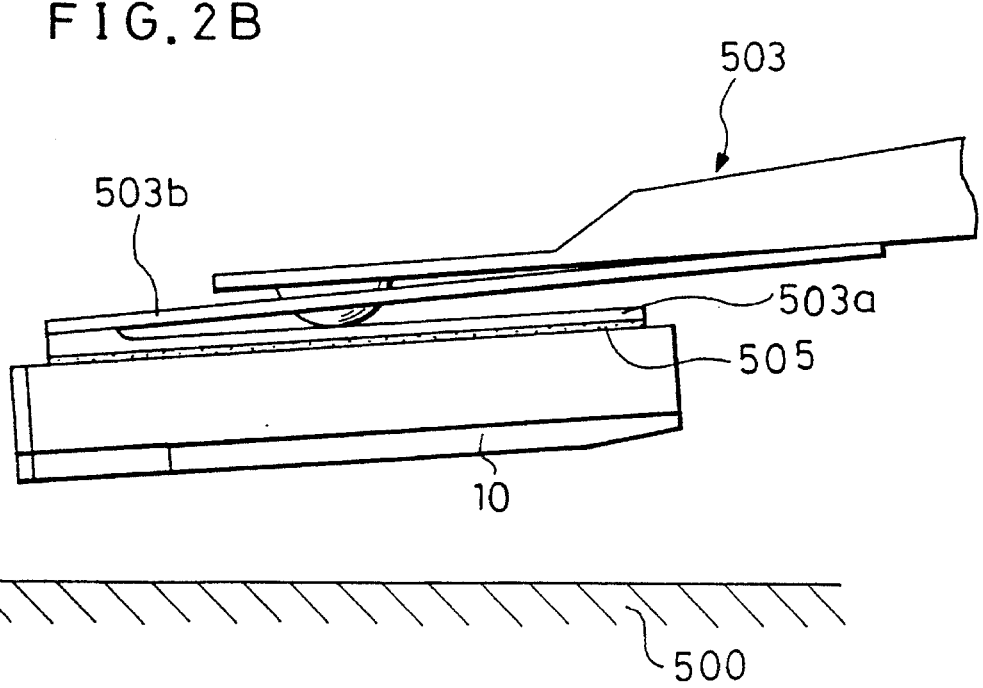
FIG. 2B is a plan view of the magnetic head seen from the radial direction of a magnetic disk.

FIG. 1 is a perspective view of rigid magnetic disk drives. FIG. 2A is a perspective view of a magnetic head. FIG. 2B is a plan view of the magnetic head seen from the radial direction of a magnetic disk.

In FIG. 1, rigid magnetic disk drives 400 comprises a magnetic disk 500, a rotary type actuator 501 and a magnetic head 10 supported by the rotary type actuator 501. The rotary type actuator 501 comprises a driving arm 502 and a suspension 503 supporting the magnetic head 10, and rotatably moves in the direction of arrows "B" and "C" shown in FIG. 1 above the magnetic disk 500 rotating in the direction of arrow shown in FIG. 1.

In FIG. 2A and FIG. 2B, the magnetic head 10 is fixed at a tongue part 503a of the suspension 503 by adhesive resin layer 505. Furthermore, rolling and pitching of the magnetic head 10 are absorbed by deformations of a first and a second frame parts 503b and 503c of the suspension 503.

Figure 3A:
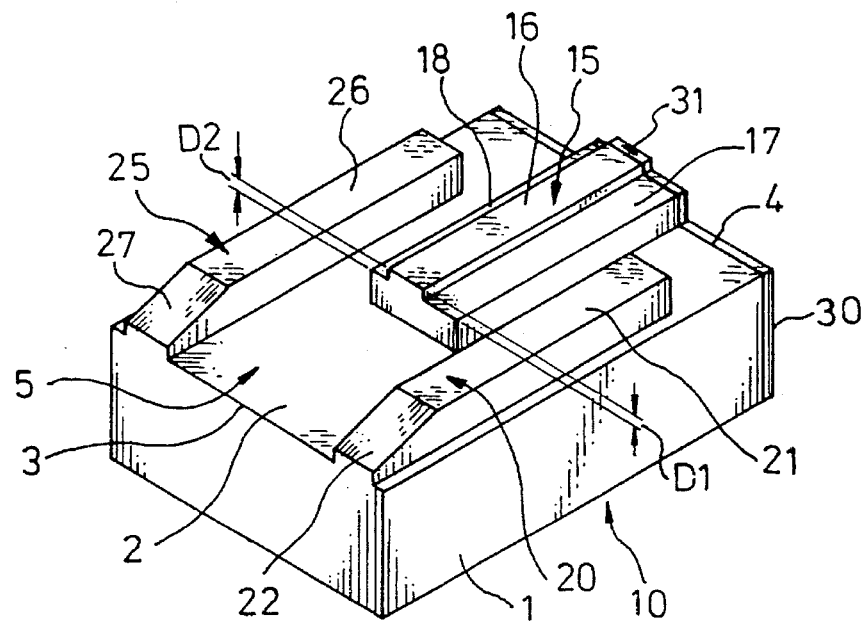
FIG. 3A is a perspective view of the magnetic head having the magnetic head slider of a first embodiment of the present invention.
Figure 3B:
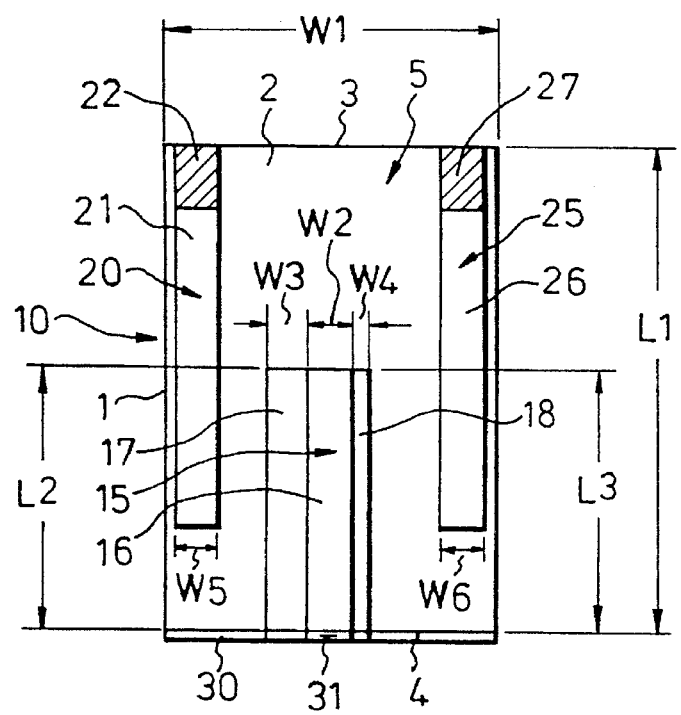
FIG. 3B is a plan view of the magnetic head shown in FIG. 3A seen from the magnetic disk.

FIG. 3A is a perspective view of a magnetic head having a magnetic head slider of a first embodiment of the present invention. FIG. 3B is a plan view of the magnetic head shown in FIG. 3A seen from the magnetic disk.

In FIG. 3A and FIG. 3B, a magnetic head 10 comprises the magnetic head slider 1 (hereinafter referred to as a slider 1) and a magnetic transducer 30.

In the slider 1, a first rail 20 and a second rail 25 are provided on a surface 2, which faces to the magnetic disk with a predetermined pitch angle, so as to extend from the front end 3 of the surface 2 toward the rear end 4 of the surface 2, respectively. Furthermore, a third rail 15 is provided on the surface 2 between the first rail 20 and the second rail 25 so as to extend from a middle part of the slider 1 to the rear end 4. Additionally, the first, the second and the third rails 20, 25 and 15 are formed by chemical etching, laser beam etching, ion milling and grinding.

Subsequently, the first rail 20 comprises a first air bearing surface 21 and a first tapered part 22 having a predetermined angle to the first air bearing surface 21. Similarly, the second rail 25 comprises a second air bearing surface 26 and a second tapered part 27 having the predetermined angle to the second air bearing surface 26. Next, the third rail 15 comprises a third air bearing surface 16, a first air pressurization part 17 and a second air pressurization part 18 which are formed parallel with the third air bearing surface 16, respectively. Furthermore, the third air bearing surface 16 is disposed between the first air pressurization part 17 and the second air pressurization part 18. And the first air pressurization part 17 is sunk by a first depth "D1" from the third air bearing surface 16, and the second air pressurization part 18 is sunk by a second depth "D2" from the third air bearing surface 16. Additionally, the first, the second and the third air bearing surfaces 21, 26 and 16 are formed in coplanar surfaces with each other substantially.

A length of the first air pressurization part 317, which is shown in "L2" of FIG. 3B, is more than 200 μm; and a length of the second air pressurization part 18, which is shown in "L3" of FIG. 3B, is more than 200 μm. The first depth "D1" as shown in FIG. 3A is equal to the second depth "D2" as shown in FIG. 3A and is preferably between 0.1 μm and 4 μm. If the first depth "D1" and the second depth "D2" are over 4 μm, they can not pressurize the air flow enough to compensate for the reduction of the lifting forces. And the first depth "D1" and the second depth "D2" are under 0.1 μm, fabrication tolerance for the depths "D1" and "D2" are so severe that the fabrication costs are high. A width of the first air pressurization part 17, which is shown in "W3" of FIG. 3B, is broader than a width of the second air pressurization part 18 shown in "W4" of FIG. 3B.

Then, a slot part 5 is formed between the first rail 20 and the second rail 25 in the surface 2 by chemical etching, laser beam etching, ion milling and grinding.

Subsequently, the magnetic transducer 30 having a magnetic gap 31 is fixed at the rear end 4 in a manner that the magnetic gap 31 and the third air bearing surface 16 are formed in coplanar surfaces with each other substantially. Furthermore, a distance between the magnetic gap 31 and the magnetic disk (hereinafter referred to as a flying height) maintains constant height.

A flying characteristic of the slider 1 will be explained with reference to FIG. 4, which is a graph showing pressure profiles obtained by rails 15, 20 and 25 of the slider 1 shown in FIG. 3A between the front end 3 and the rear end 4.

Figure 4:
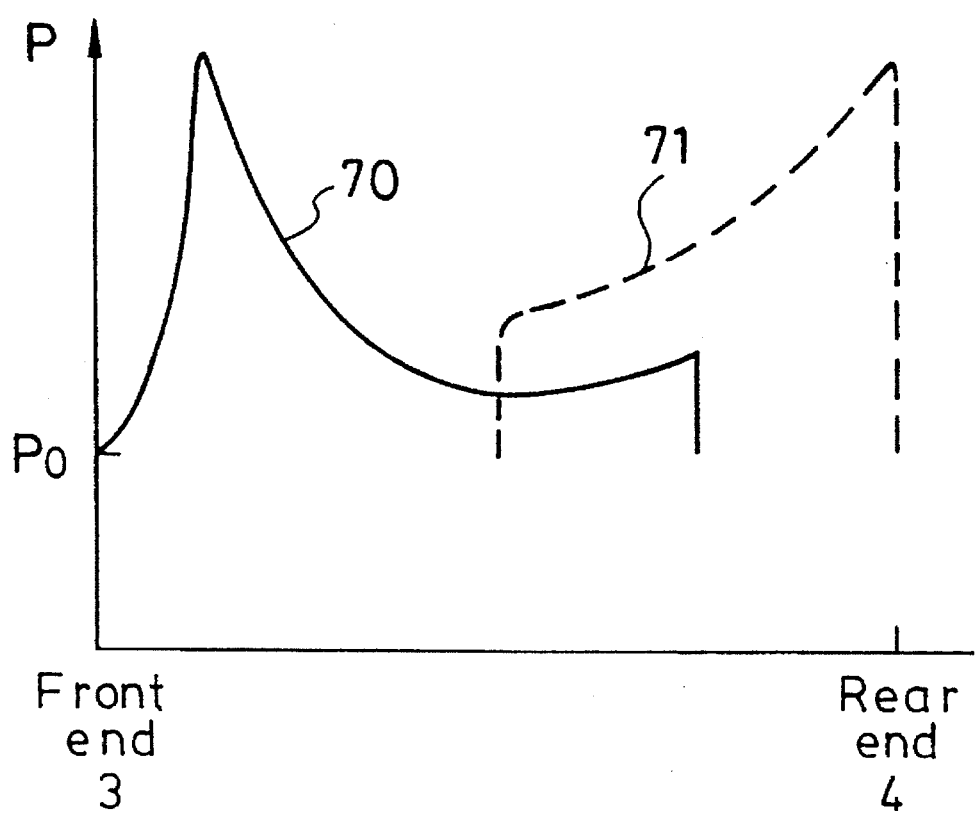
FIG. 4 is a graph showing pressure profiles, which are obtained by rails 15, 20 and 25 of the magnetic head slider 1 shown in FIG. 3A, along the positions between the front end 3 and the rear end 4.

In FIG. 4, a solid line curve 70 is a pressure profile obtained by the first rail 20 or the second rail 25, and a broken line curve 71 is a pressure profile obtained by the third rail 15. As shown in the solid line curve 70, the pressure profile obtained by the first rail 20 or the second rail 25 has a high pressure peak near the front end 3 and decreases toward the rear end 4. On the other hand, as shown in the broken line curve 71, the pressure profile obtained by the third rail 15 has a lower pressure near the middle part and a higher pressure peak near the rear end 4. Thereby, a pressure profile obtained by the slider 1 has a highest pressure near the front end 3, a comparatively low pressure in the middle part, and another highest pressure near the rear end 4. Since the magnetic gap 31 is disposed at the back of the third rail 15, when the slider 1 is formed in a small size, the flying height becomes stable against pitching and rolling of the slider 1.

Subsequently, in the slider 1, the third rail 15 is formed between the first rail 20 and the second rail 25, and the third air bearing surface 16 is disposed between the first air pressurization part 17 having the first depth "D1" and the second air pressurization part having the second depth "D2". Therefore, when the skew angle "θ" exists in "θ3" as shown in FIG. 14B, the air flow is pressurized mainly by the first air pressurization part 17, and reduction of the lifting force is compensated. Similarly, when the skew angle "θ" exists in "θ4" as shown in FIG. 14D, the air flow is pressurized mainly by the second air pressurization part 18, and reduction of the lifting force is compensated.

Furthermore, in this slider 1, when differences of velocity of the air flow is considered, the first depth "D1" is equal to the second depth "D2" and the width "W3" is larger than the width "W4". Accordingly, the flying height does not make a change even if the skew angle "θ" makes changes as shown in FIG. 14B and FIG. 14D from zero degree angle to some value.

Apart from the above-mentioned explanation, where the first depth "D1" is equal to the second depth "D2" and the width "W3" is larger than the width "W4", an alternative configuration may be such that the first depth "D1" is smaller than the second depth "D2" and the width "W3" is equal to the width "W4".

Figure 14A:
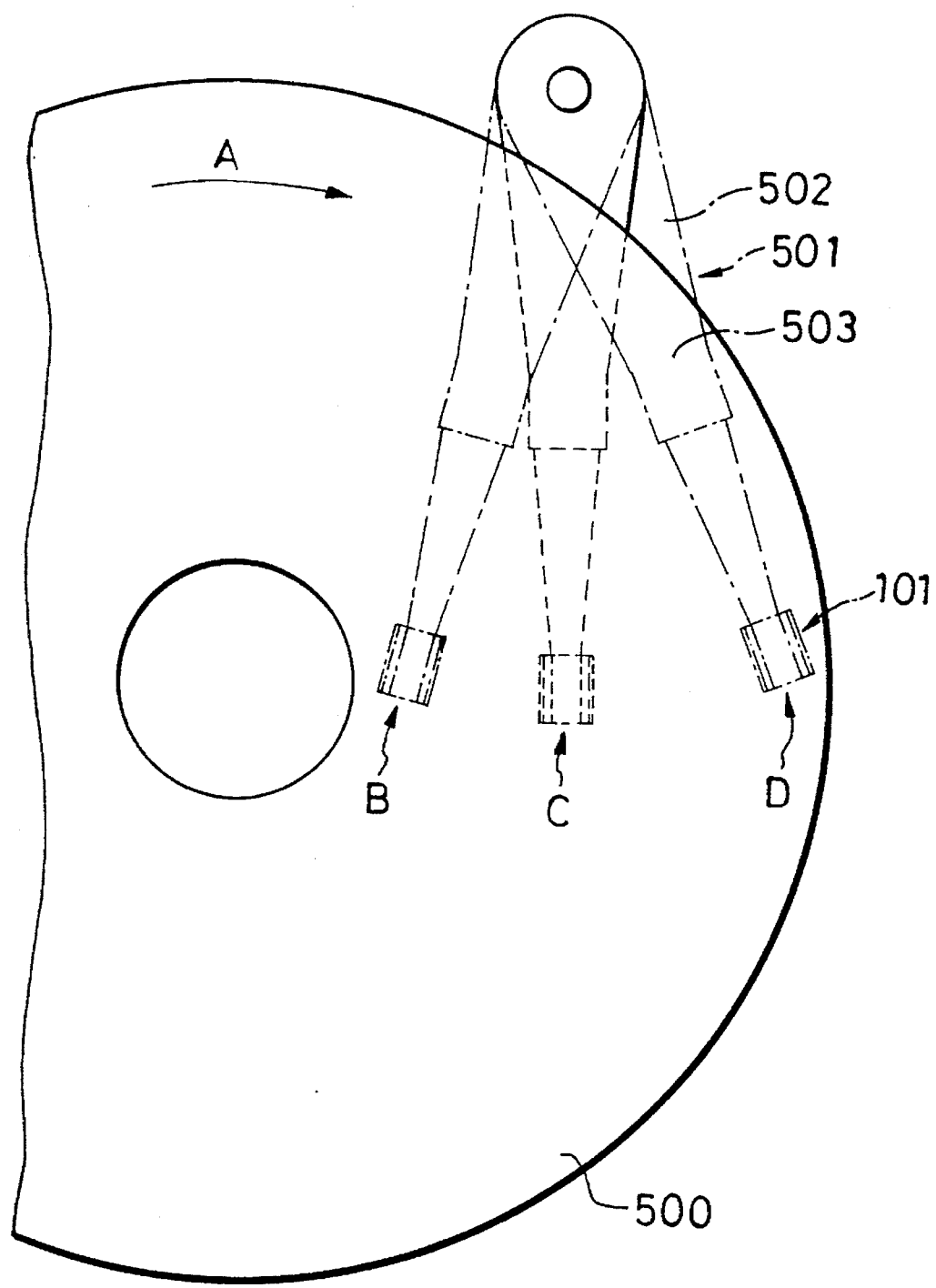
FIG. 14A is an explanatory drawing of motion of the rigid magnetic disk drives applying the rotary type actuator.
Figure 14B:
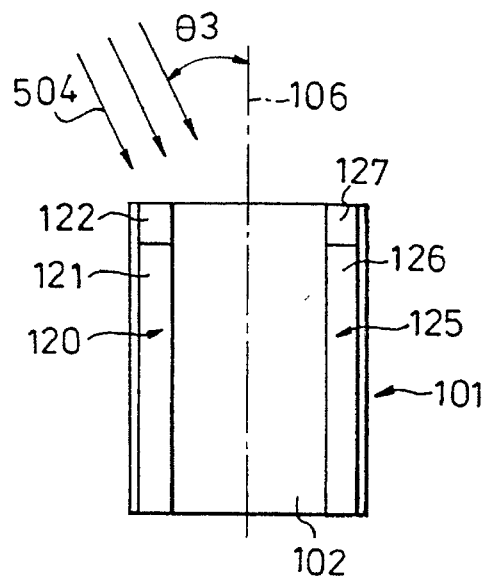
FIG. 14B is an explanatory drawing of the skew angle "θ" at a point "B" shown in FIG. 14A.
Figure 14C:
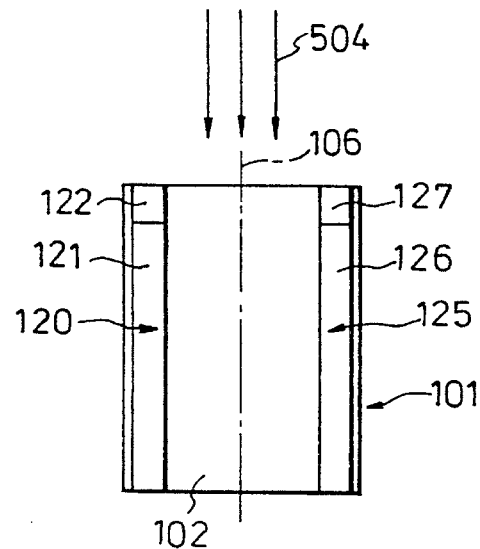
FIG. 14C is an explanatory drawing of the skew angle "θ" at a point "C" shown in FIG. 14A.
Figure 14D:
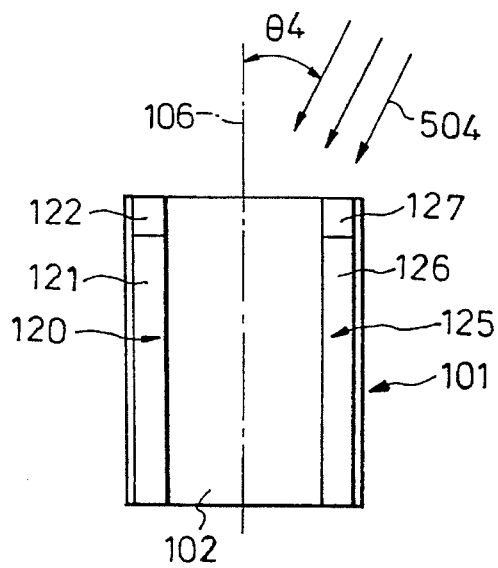
FIG. 14D is an explanatory drawing of the skew angle "θ" at a point "D" shown in FIG. 14A.
Figure 15:
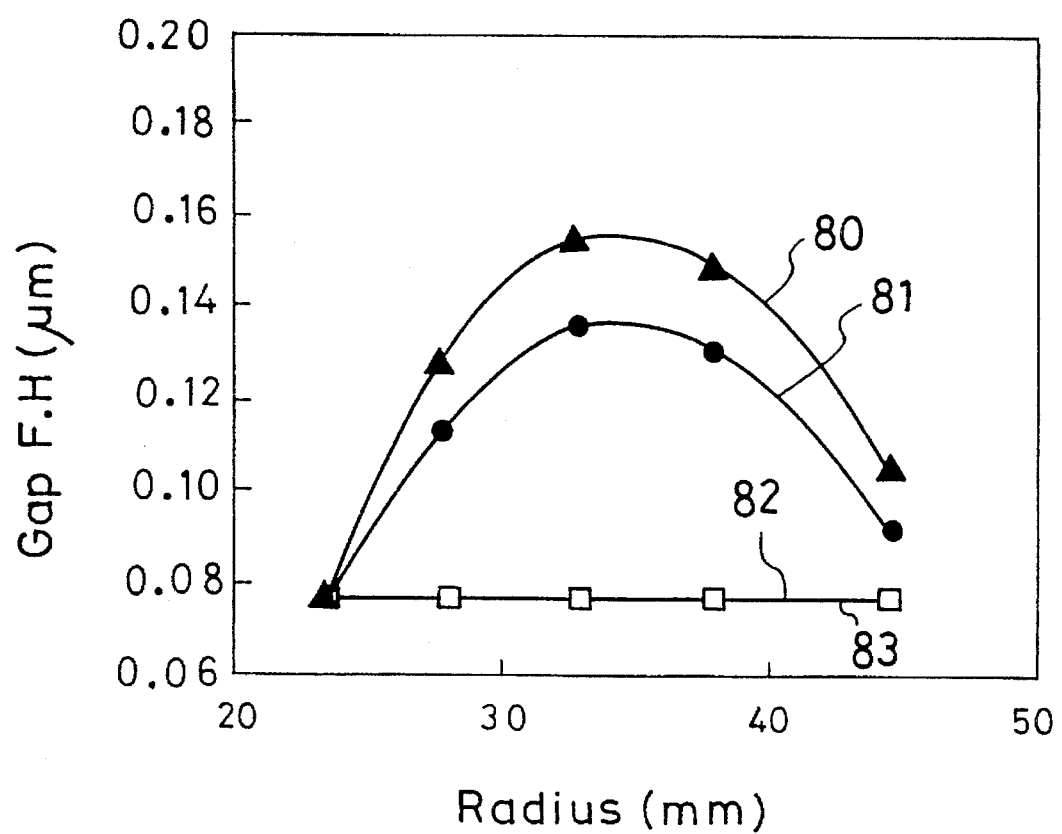
FIG. 15 is a graph showing flying characteristic obtained resulted from a computer simulation between points "B" and "D" shown in FIG. 14A.
Figure 16A:
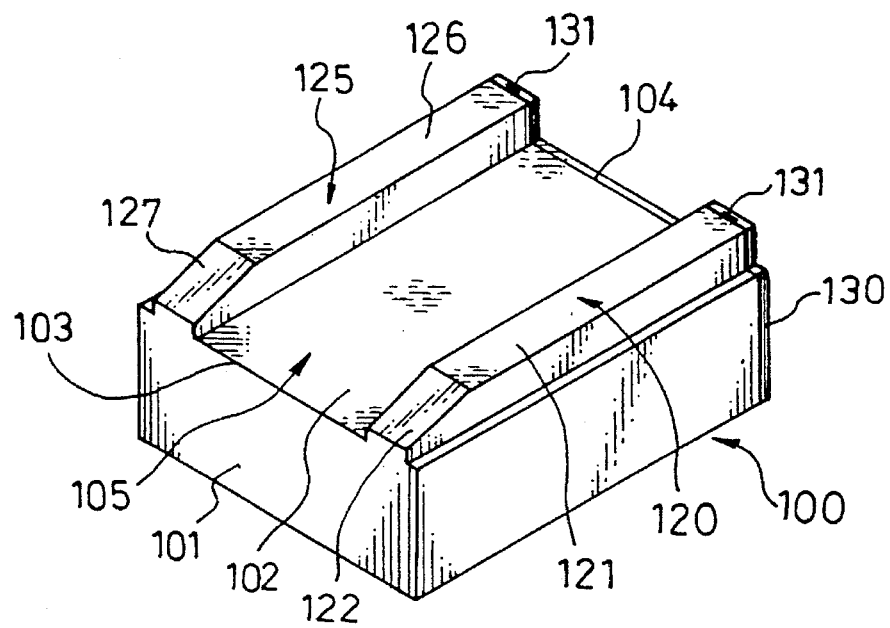
FIG. 16A is a perspective view of a conventional magnetic head having a tapered flat slider.
Figure 16B:
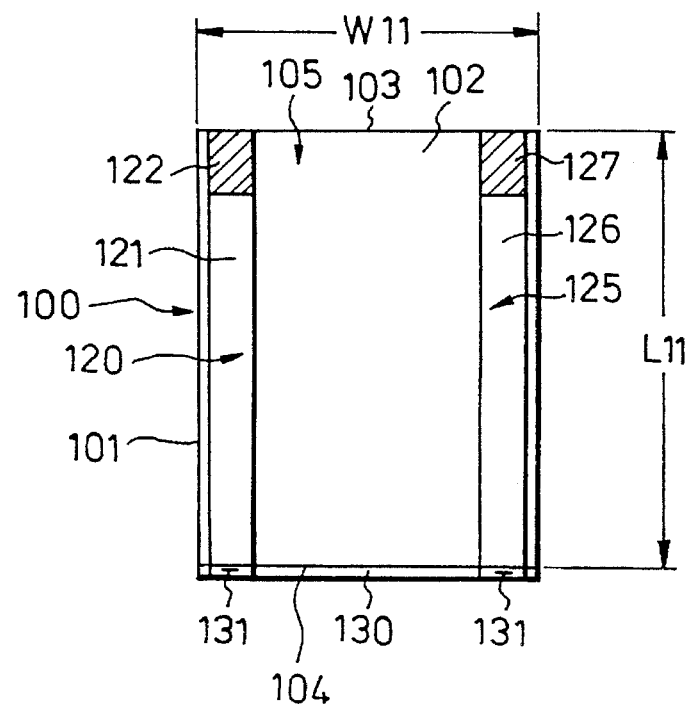
FIG. 16B is a plan view of the conventional magnetic head shown in FIG. 16A seen from the magnetic disk.
Figure 17A:
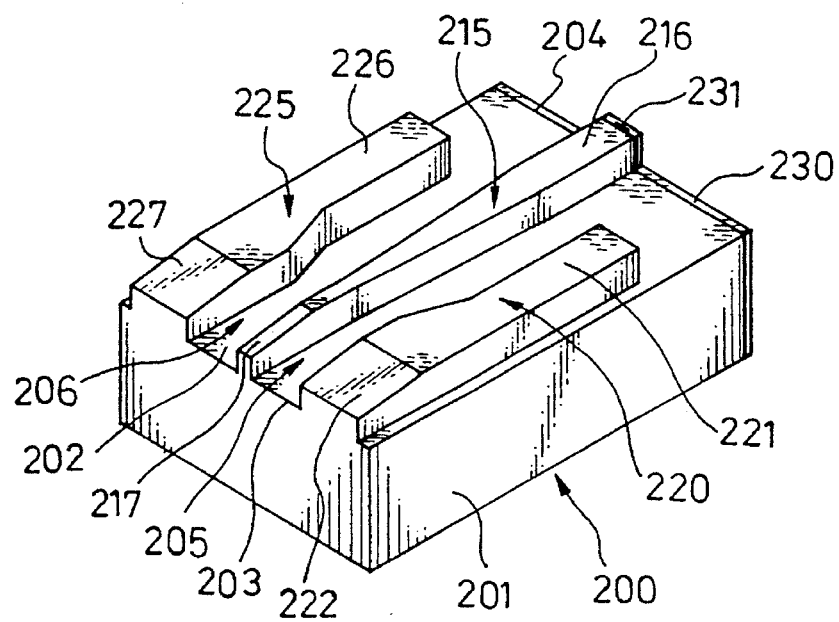
FIG. 17A is a perspective view of a conventional magnetic head having the tri-rail slider.
Figure 17B:
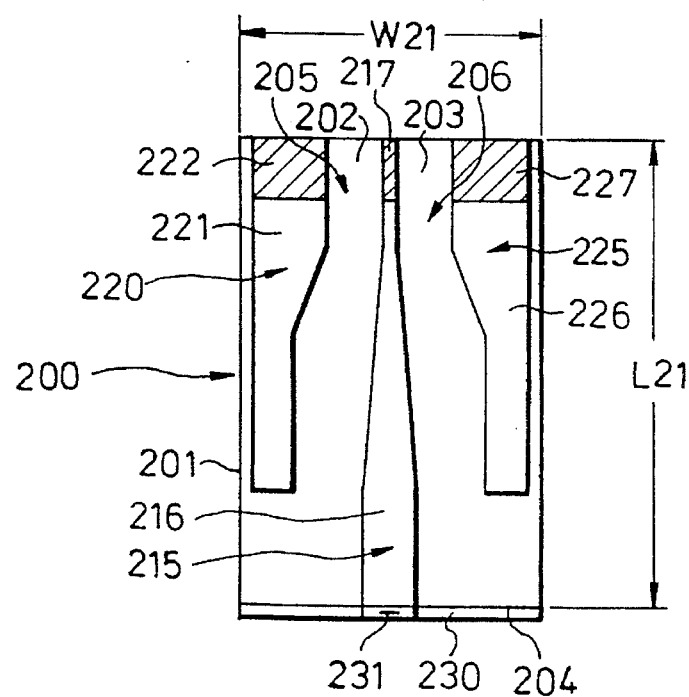
FIG. 17B is a plan view of the conventional magnetic head shown in FIG. 17A seen from the magnetic disk.
Figure 18:
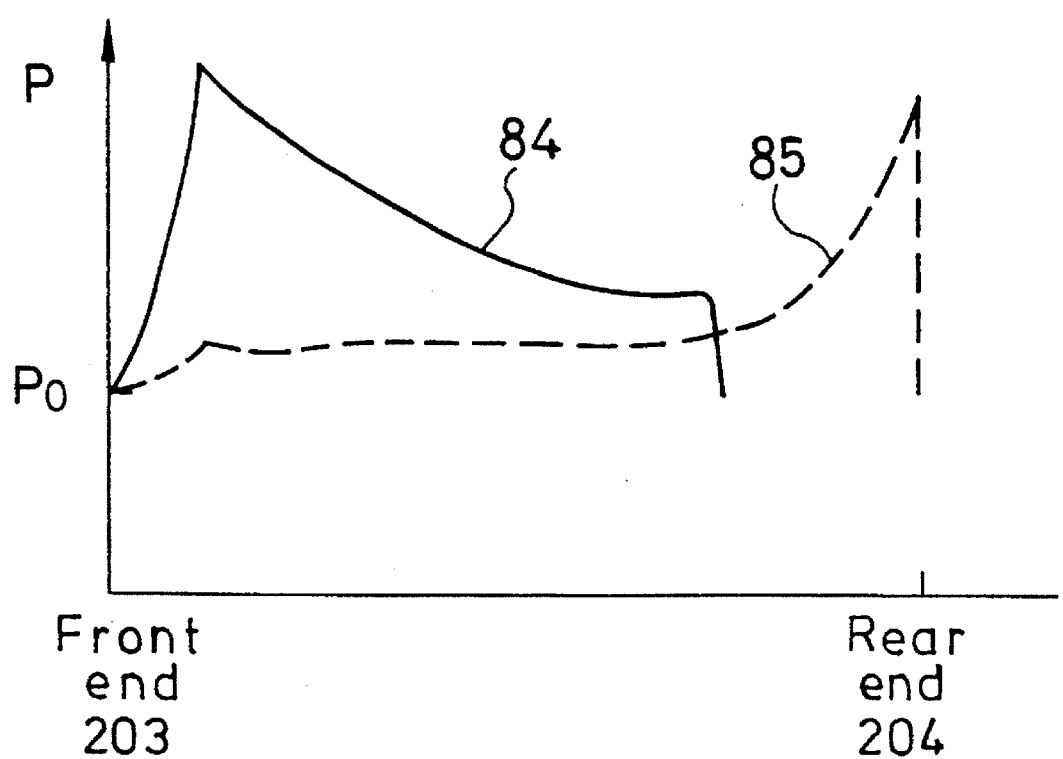
FIG. 18 is a graph showing pressure profiles, which are obtained by rails 215, 220 and 225 of the tri-rail slider 201 shown in FIG. 17A, along the positions between the front end 203 and the rear end 204.
Figure 19A:
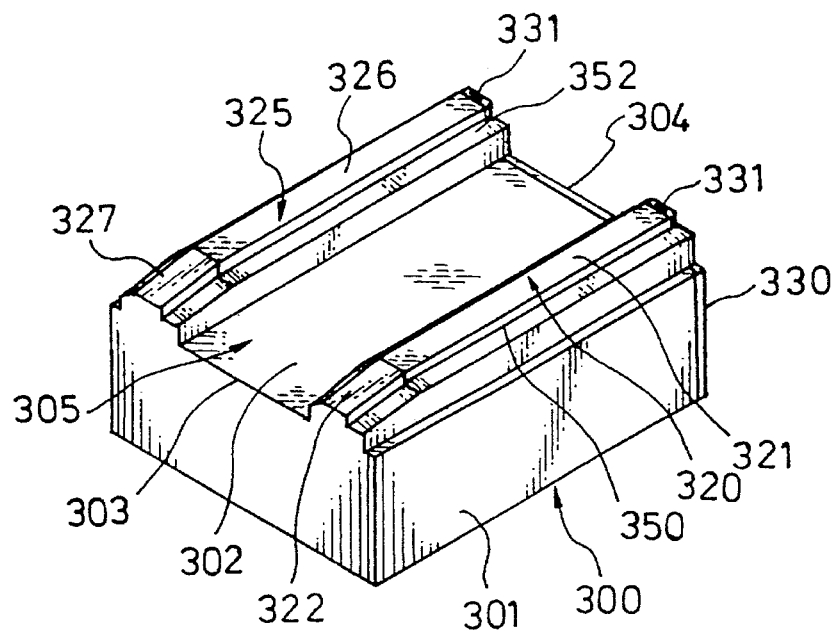
FIG. 19A is a perspective view of a conventional magnetic head having the TPC slider.
Figure 19B:
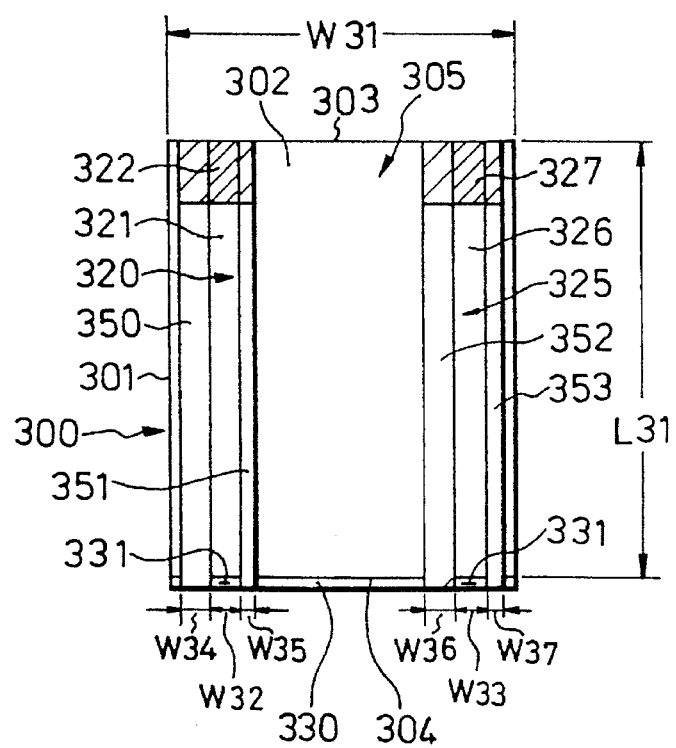
FIG. 19B is a plan view of the conventional magnetic head shown in FIG. 19A seen from the magnetic disk.

Now, flying characteristic will be shown in FIG. 15, which is a graph showing change of the flying height obtained from a computer simulation along the positions between points "B" and "D" shown in FIG. 14A.

In FIG. 15, a solid line curve 83 is change of the flying height of the slider 1. In this computer simulation, the following parameters are given as basic conditions:
(1) Diameter of the magnetic disk =3.5 inch,
(2) Revolution speed of the magnetic disk =5400 r.p.m.,
(3) Angles of the skew angle "θ3" and the skew angle "θ4" are 13.1 degree angle,
(4) Load for a center of the slider toward the magnetic disk =3 gram.

Furthermore, in this computer simulation, each lengths of the slider 1 as shown in FIG. 3A and FIG. 3B are as follows:

D1=D2=1 μm, W1=2.5 mm, L1=1.5 mm,

W2=W5=W6=183 μm,

W3=172 μm, W4=76 μm

As shown in the solid line 83, the flying height of the slider 1 is constant in a range between points "B" and "D" shown in FIG. 14A, and the flying characteristic of the slider 1 is more excellent as compared with the tapered flat slider 101 and the tri-rail slider 201, and is equal to the TPC slider 301. Moreover, in the slider 1, stability against pitching and rolling is larger than that of the TPC slider 301. Therefore, when the slider 1 receives a disturbance of the air flow induced by a seek motion or the like, the flying height hardly makes a large change, and there is no problem that the recorded information on the magnetic disk is broken down by contact of the slider 1 to the magnetic disk.

Furthermore, in the slider 1, the first and the second air pressurization parts 17 and 18 are provided on the third rail 15 disposed between the first and the second rails 20 and 25. Therefore, a difference between the center of the gravity of the slider 1 and the center of the lifting force in the widthwise direction of the slider 1 hardly becomes larger. Therefore, high stability against rolling of the slider 1 is achieved. Thereby, it is possible to increase the first depth "D1" and the width "W3" of the first air pressurization part 17 and the second depth "D2" and the width "W4" of the second air pressurization part 18.

For example, even if each lengths of the slider 1 as shown in FIG. 3A and FIG. 3B change as follows:

D1=D2=2 μm, W1=2.5 mm, L1=1.5 mm,

W2=W5=W6=183 μm,

W3=450 μm, W4=310 μm, a result of the aforementioned computer simulation is nearly equal to the solid line 83. Accordingly, it is possible that fabrication precision of the slider 1 can be low, and manufacturing costs can be low.

Figure 3C:
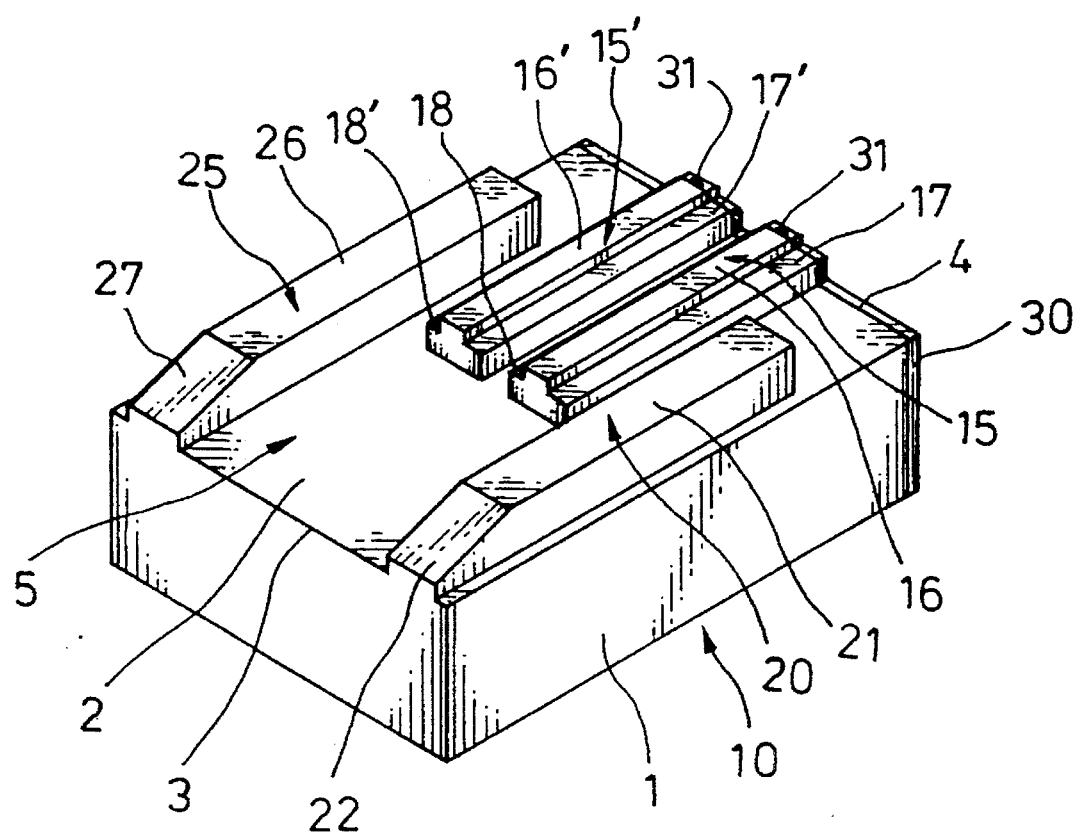
FIG. 3C is a perspective view of the magnetic head having the magnetic head slider of a different embodiment from the first embodiment of the present invention.

FIG. 3C is a perspective view of the magnetic head having the magnetic head slider of a different embodiment from the first embodiment of the present invention. Apart from the aforementioned explanation, where the third rail 15 is disposed between the first rail 20 and the second rail 25, as shown in FIG. 3C, an alternative configuration may be such that the third rail 15 and a fourth rail 15' having a first and a second air pressurization parts 17', 18' are disposed between the first rail 20 and the second rail 25.

A MODIFIED VERSION OF THE FIRST EXAMPLE

Figure 5A:
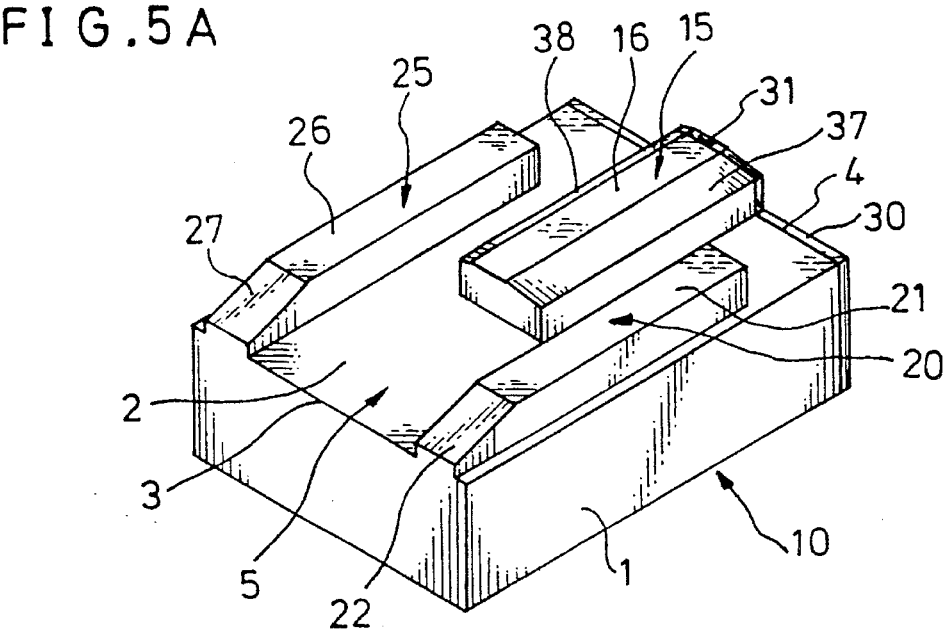
FIG. 5A is a perspective view of a magnetic head having a magnetic head slider which is a modified version of the first embodiment of the present invention.
Figure 5B:
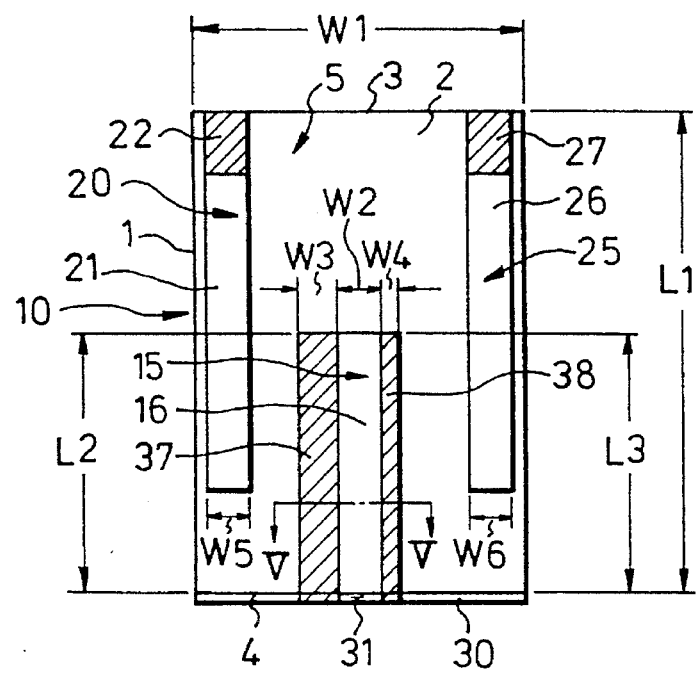
FIG. 5B is a plan view of the magnetic head shown in FIG. 5A seen from the magnetic disk.
Figure 5C:
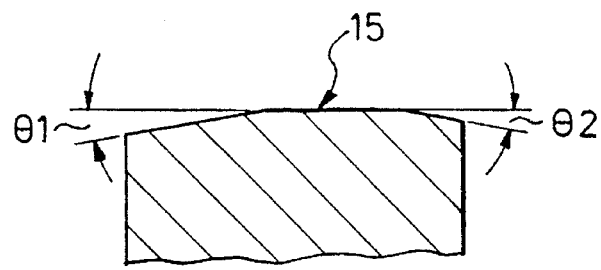
FIG. 5C is a partial cross sectional view taken on line V—V in FIG. 5B showing a third rail.

A modified version of the first example will be explained with reference to FIG. 5A, FIG. 5B and FIG. 5C. FIG. 5A is a perspective view of a magnetic head having a magnetic head slider which is a modified version of the first embodiment of the present Invention. FIG. 5B is a plan view of the magnetic head shown in FIG. 5A seen from the magnetic disk. FIG. 5C is a partial cross sectional view taken on line V—V in FIG. 5B showing a third rail. In this modified version, the same components and parts as those of the first embodiment are designated by the same numerals and the corresponding descriptions similarly apply. Therefore, the descriptions will be made mainly on the modified parts from the first embodiment.

In FIG. 5A, FIG. 5B and FIG. 5C, the third rail 15 comprises the third air bearing surface 16, a first air pressurization part 37 and a second air pressurization part 38. Furthermore, the first air pressurization part 37 is formed into a tapered shape with a first angle "θ1" to the third air bearing surface 16, and the second air pressurization part 38 is formed into a tapered shape with a second angle "θ2" to the third air bearing surface 16. The first and second angles "θ1" and "θ2" are preferably less than 2 degree angle.

As above-mentioned, since the first and the second air pressurization parts 37 and 38 are formed into the tapered shape, when the skew angle "θ" increases, the air flow is pressurized smoothly.

SECOND EXAMPLE

Figure 6A:
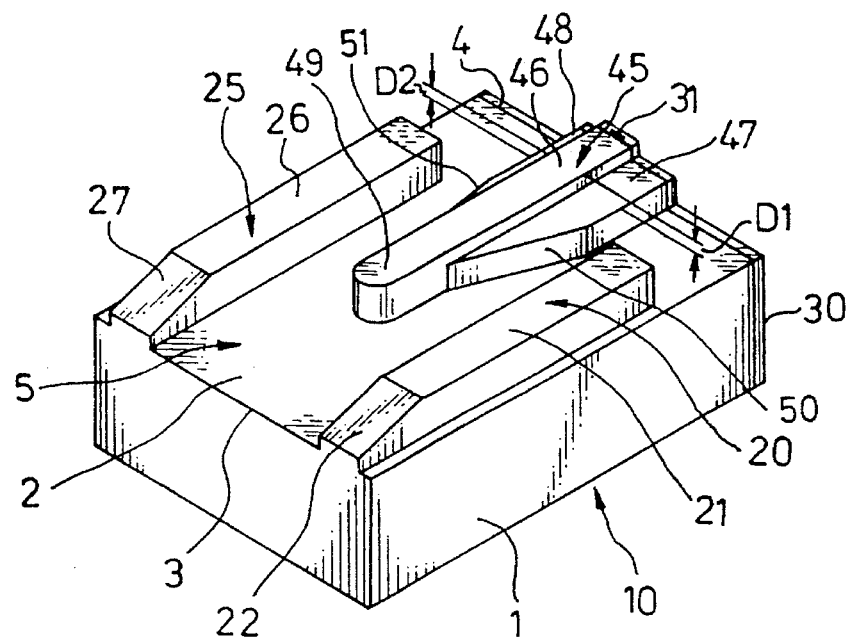
FIG. 6A is a perspective view of a magnetic head having a magnetic head slider of a second embodiment of the present invention.
Figure 6B:
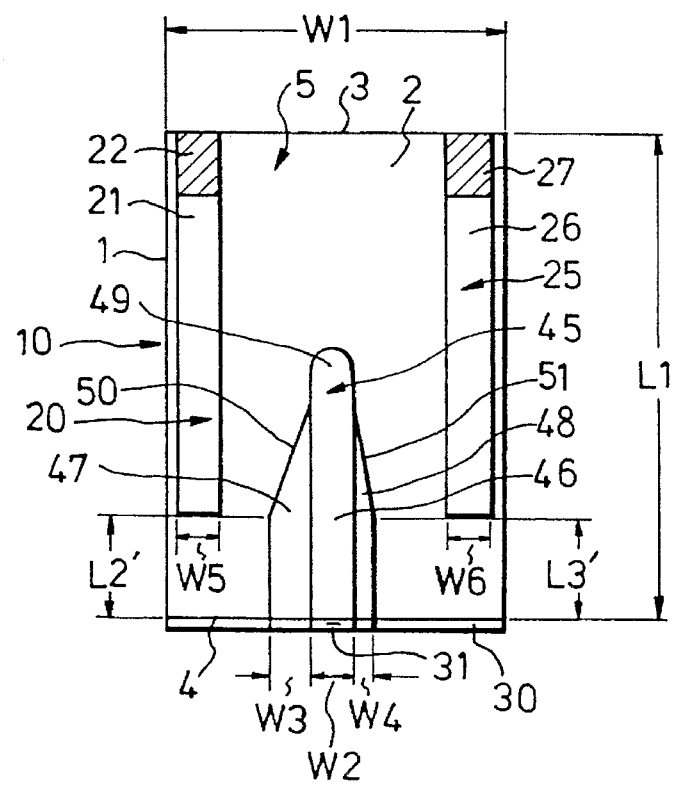
FIG. 6B is a plan view of the magnetic head shown in FIG. 6A seen from the magnetic disk.

FIG. 6A is a perspective view of a magnetic head having a magnetic head slider of a second embodiment of the present invention. FIG. 6B is a plan view of the magnetic head shown in FIG. 6A seen from the magnetic disk.

In this second embodiment, the same components and parts as those of the first embodiment are designated by the same numerals and the corresponding descriptions similarly apply. Therefore, the descriptions will be made mainly on the difference of the second embodiment from the first embodiment.

In FIG. 6A and FIG. 6B, a third rail 45 is provided on the surface 2 between the first rail 20 and the second rail 25 so as to extend from the middle part of the slider 1 to the rear end 4.

The third rail 45 comprises a third air bearing surface 46, a first air pressurization part 47 and a second air pressurization part 48, respectively. Furthermore, the third air bearing surface 46 is disposed between the first air pressurization part 47 and the second air pressurization part 48. And the first air pressurization part 47 is sunk by a first depth "D1" from the third air bearing surface 46, and the second air pressurization part 48 is sunk by a second depth "D2" from the third air bearing surface 46. The first, the second and the third air bearing surfaces 21, 26 and 46 are formed in coplanar surfaces with each other substantially.

A semi-cylindrical part 49 is provided at the side of the front end 3 of the third rail 45 having the third air bearing surface 46, and a first inclined edge 50 and a second inclined edge 51 are provided at the side of the front end 3 of the first air pressurization part 47 and at the side of the front end 3 of the second air pressurization part 48, respectively. Additionally, lengths "L2'" and "L3'" as shown in FIG. 6B correspond to the lengths "L2" and "L3" as shown in FIG. 3B, respectively.

In the slider 1, the third rail 45 is formed between the first rail 20 and the second rail 25, and the third air bearing surface 46 is disposed between the first air pressurization part 47 having the first depth "D1" and the second air pressurization part having the second depth "D2". Therefore, when the skew angle "θ" is "θ3" as shown in FIG. 14B, the air flow is pressurized mainly on the first air pressurization part 17, and reduction of the lifting force is compensated. Similarly, when the skew angle "θ" is "θ4" as shown in FIG. 14D, the air flow is pressurized mainly on the second air pressurization part 18, and reduction of the lifting force is compensated.

Furthermore, in this slider 1, when differences of velocity of the air flow is considered, the first depth "D1" is equal to the second depth "D2" and the width "W3" is larger than the width "W4". Accordingly, the flying height does not make a change even if the skew angle "θ" makes changes as shown in FIG. 14B and FIG. 14D from zero degree angle to some value.

The first inclined edge 50 and the second inclined edge 51 (FIG. 6B) are provided at the side of the front end 3 of the first air pressurization part 47 and at the side of the front end 3 of the second air pressurization part 48, respectively. Therefore, when dust particles get into spaces, which are formed between the third rail 45 and the first rail 20 or the second rail 25, the spaces are hardly filled with dust particles.

A MODIFIED VERSION OF THE SECOND EXAMPLE

Figure 7A:
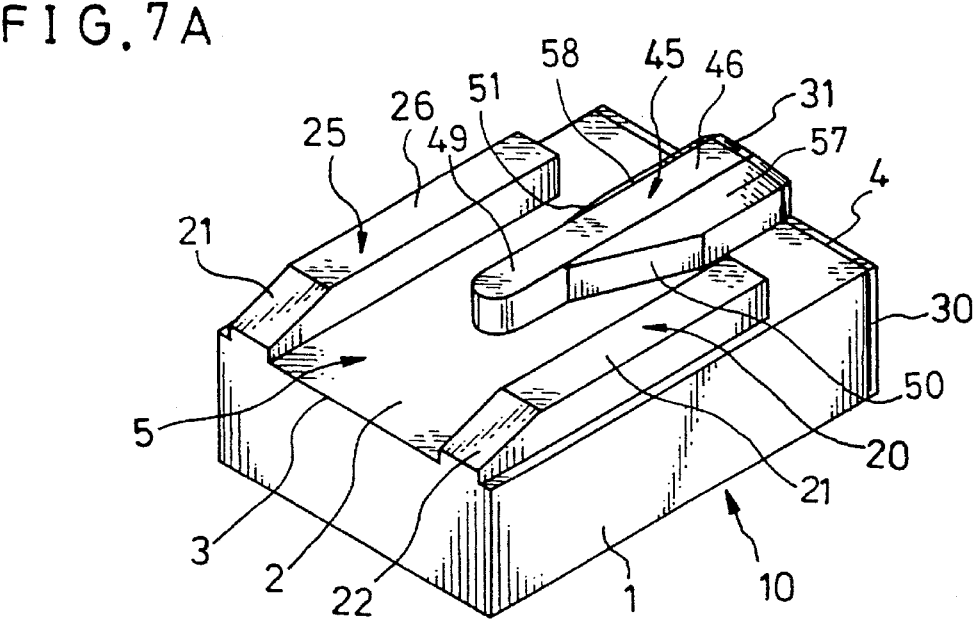
FIG. 7A is a perspective view of a magnetic head having a magnetic head slider which is a modified version of the second embodiment of the present invention.
Figure 7B:
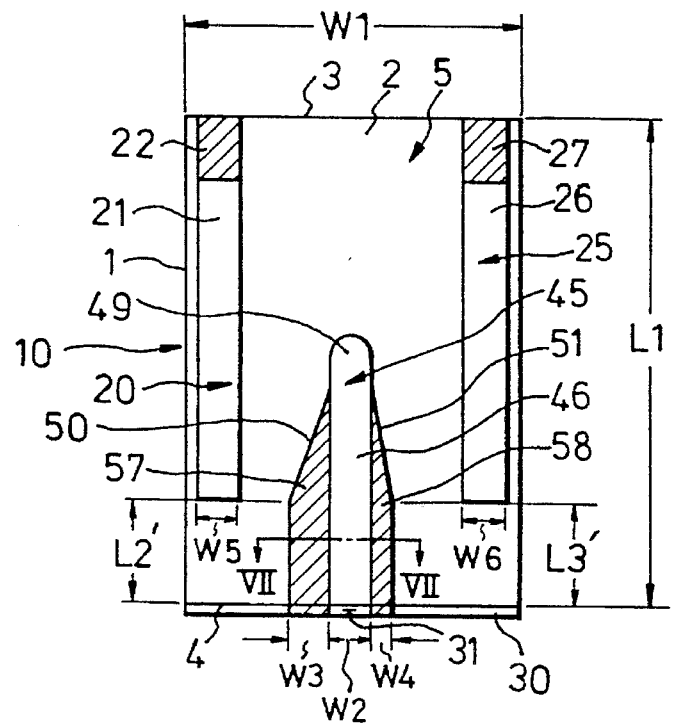
FIG. 7B is a plan view of the magnetic head shown in FIG. 7A seen from the magnetic disk.
Figure 7C:
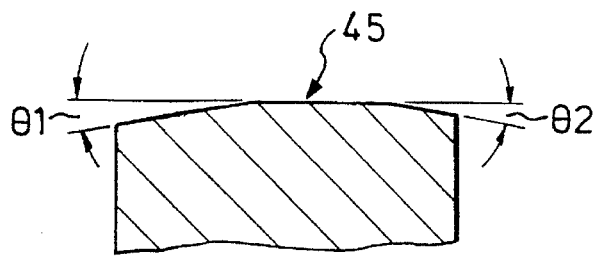
FIG. 7C is a partial cross sectional view taken on line VII—VII in FIG. 7B showing the third rail.

A modified version of the first example will be explained with reference to FIG. 7A, FIG. 7B and FIG. 7C. FIG. 7A is a perspective view of a magnetic head having a magnetic head slider which is a modified version of the second embodiment of the present invention. FIG. 7B is a plan view of the magnetic head shown in FIG. 7A seen from the magnetic disk. FIG. 7C is a partial cross sectional view taken on line VII—VII in FIG. 7B showing a third rail. In this modified version, the same components and parts as those of the second embodiment are designated by the same numerals and the corresponding descriptions similarly apply.

Therefore, the descriptions will be made mainly on the modified parts from the second embodiment.

In FIG. 7A, FIG. 7B and FIG. 7C, the third rail 45 comprises the third air bearing surface 46, a first air pressurization part 57 and a second air pressurization part 58. The first air pressurization part 57 is formed into a tapered shape with a first angle "θ1" to the third air bearing surface 46, and the second air pressurization part 58 is formed into a tapered shape with a second angle "θ2" to the third air bearing surface 46. The first and second angles "θ1" and "θ2" are preferably less than 2 degree angle.

As above-mentioned, since the first and the second air pressurization parts 57 and 58 are formed into the tapered shape, even when the skew angle "θ" fluctuates from zero degree angle to some value, the air flow is pressurized smoothly.

THIRD EXAMPLE

Figure 8A:
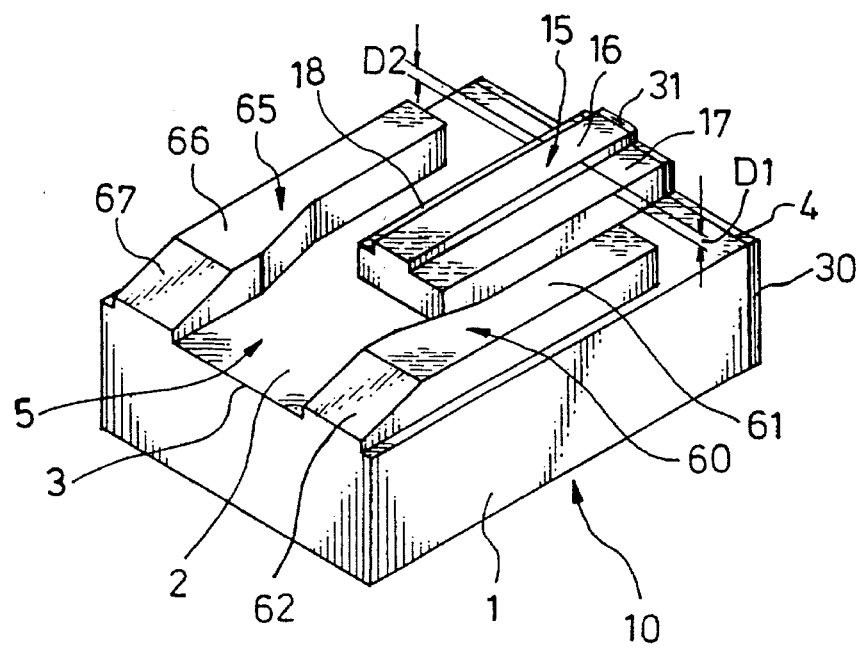
FIG. 8A is a perspective view of a magnetic head having a magnetic head slider of a third embodiment of the present invention.
Figure 8B:
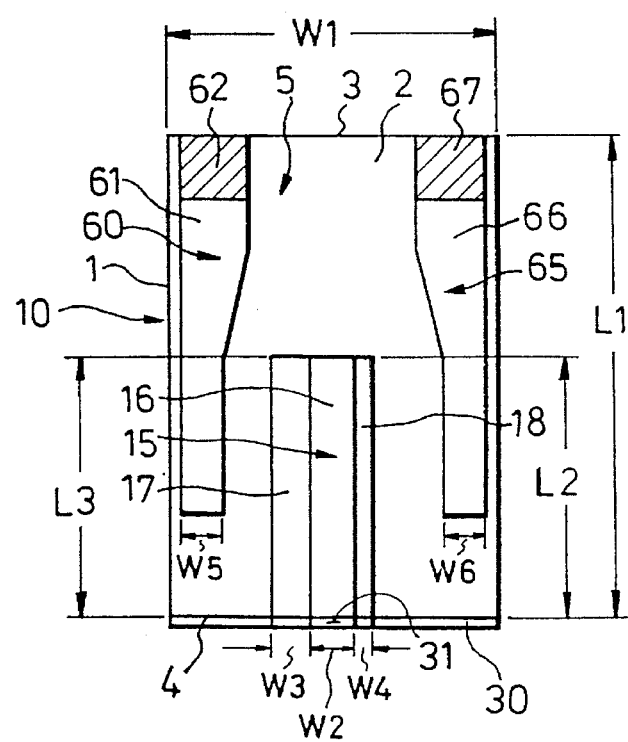
FIG. 8B is a plan view of the magnetic head shown in FIG. 8A seen from the magnetic disk.

FIG. 8A is a perspective view of a magnetic head having a magnetic head slider of a third embodiment of the present invention. FIG. 8B is a plan view of the magnetic head shown in FIG. 8A seen from the magnetic disk.

In this third embodiment, the same components and parts as those of the first embodiment are designated by the same numerals and the corresponding descriptions similarly apply. Therefore, the descriptions will be made mainly on the difference of the third embodiment from the first embodiment.

In FIG. 8A and FIG. 8B, a first rail 60 and a second rail 65 are provided on the surface 2, which faces to the magnetic disk with the predetermined pitch angle, so as to extend from the front end 3 toward the rear end 4, respectively. Furthermore, the third rail 15 is provided on the surface 2 between the first rail 60 and the second rail 65 so as to extend from the middle part of the slider 1 to the rear end 4.

The first rail 60 comprises a first air bearing surface 61 and a first tapered part 62 having the predetermined angle to the first air bearing surface 61. A width of the first air bearing surface 61 at the side of the front end 3 is larger than a width thereof at the side of the rear end 4. Similarly, the second rail 65 comprises a second air bearing surface 66 and a second tapered part 67 having the predetermined angle to the second air bearing surface 66. A width of the second air bearing surface 66 at the side of the front end 3 is larger than a width thereof at the side of the rear end 4.

In this third embodiment, the width of the first tapered part 62 is larger than the width of the rear end part of the first air bearing surface 61, and the width of the second tapered part 67 is larger than the width of the rear end part of the second air bearing surface 66. Therefore, in near front end 3, a pressure profile becomes larger, and stability against pitching of the slider 1 is increased.

A MODIFIED VERSION OF THE THIRD EXAMPLE

Figure 9A:
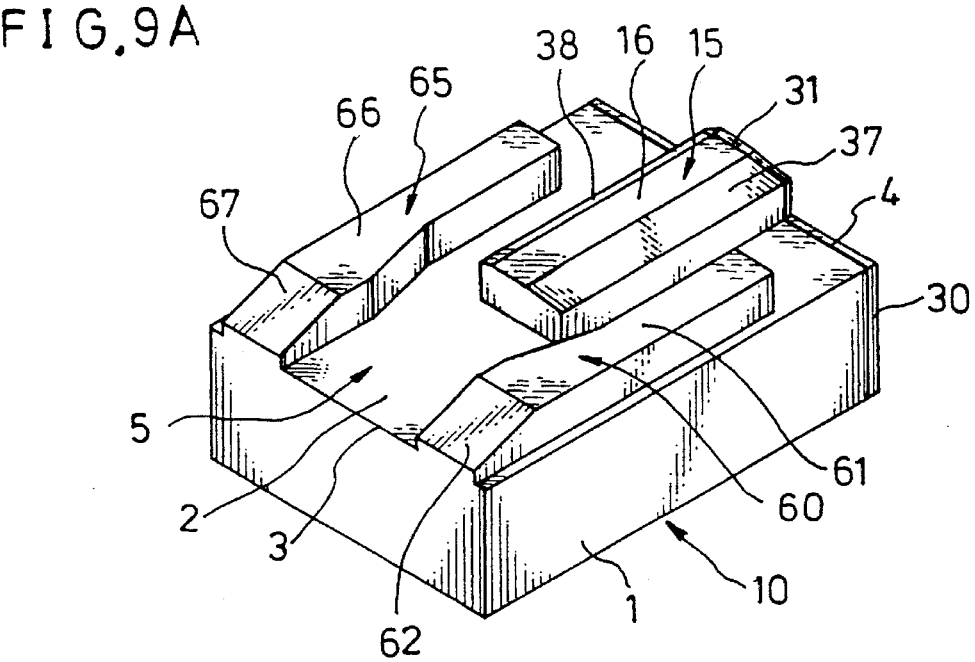
FIG. 9A is a perspective view of a magnetic head having a magnetic head slider which is a modified version of the third embodiment of the present invention.
Figure 9B:
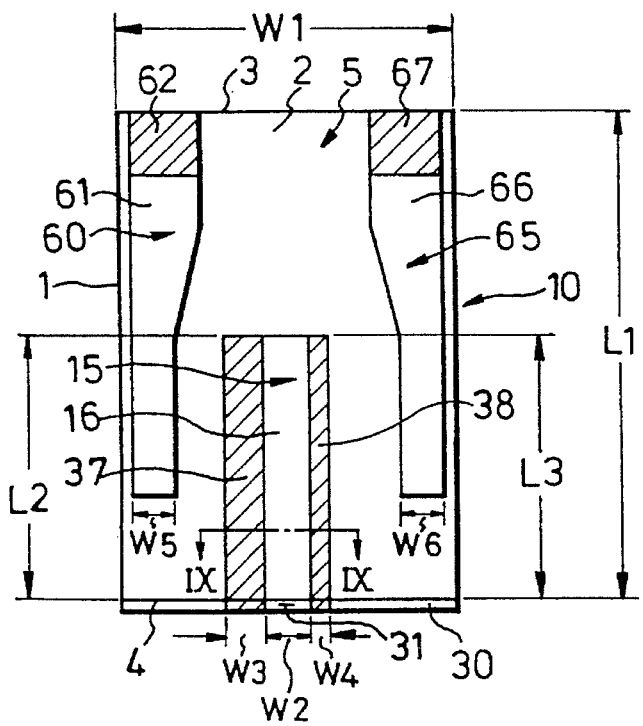
FIG. 9B is a plan view of the magnetic head shown in FIG. 9A seen from the magnetic disk.
Figure 9C:
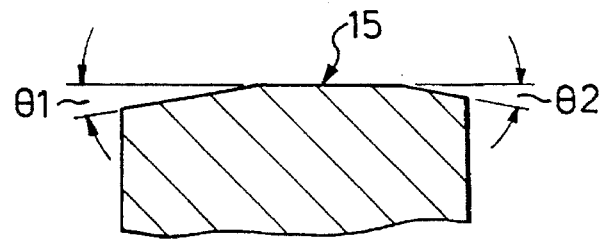
FIG. 9C is a partial cross sectional view taken on line IX—IX in FIG. 9B showing the third rail.

A modified version of the third example will be explained with reference to FIG. 9A, FIG. 9B and FIG. 9C. FIG. 9A is a perspective view of a magnetic head having a magnetic head slider which is a modified version of the third embodiment of the present invention. FIG. 9B is a plan view of the magnetic head shown in FIG. 9A seen from the magnetic disk. FIG. 9C is a partial cross sectional view taken on line IX—IX in FIG. 9B showing a third rail. In this modified version, the same components and parts as those of the third embodiment are designated by the same numerals and the corresponding descriptions similarly apply. Therefore, the descriptions will be made mainly on the modified parts from the third embodiment.

In FIG. 9A, FIG. 9B and FIG. 9C, the third rail 15 comprises the third air bearing surface 16, a first air pressurization part 37 and a second air pressurization part 38. The first air pressurization part 37 is formed into a tapered shape with a first angle "θ1" to the third air bearing surface 16, and the second air pressurization part 38 is formed into a tapered shape with a second angle "θ2" to the third air bearing surface 16. The first and second angles "θ1" and "θ2" are preferably less than 2 degree angle.

As above-mentioned, since the first and the second air pressurization parts 37 and 38 are formed into the tapered shape, when the skew angle "θ" changes from zero degree angle to some value, the air flow is pressurized smoothly.

FOURTH EXAMPLE

Figure 10A:
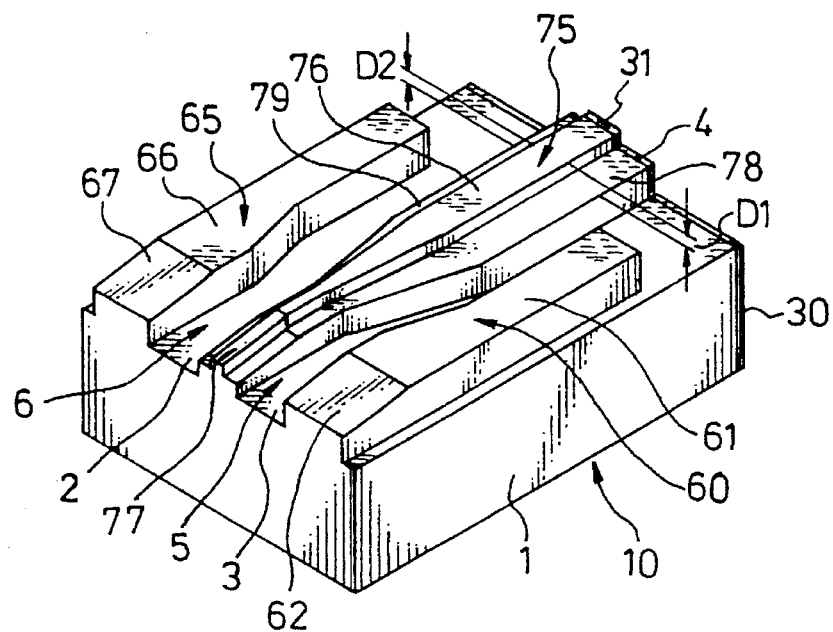
FIG. 10A is a perspective view of a magnetic head having a magnetic head slider of a fourth embodiment of the present invention.
Figure 10B:
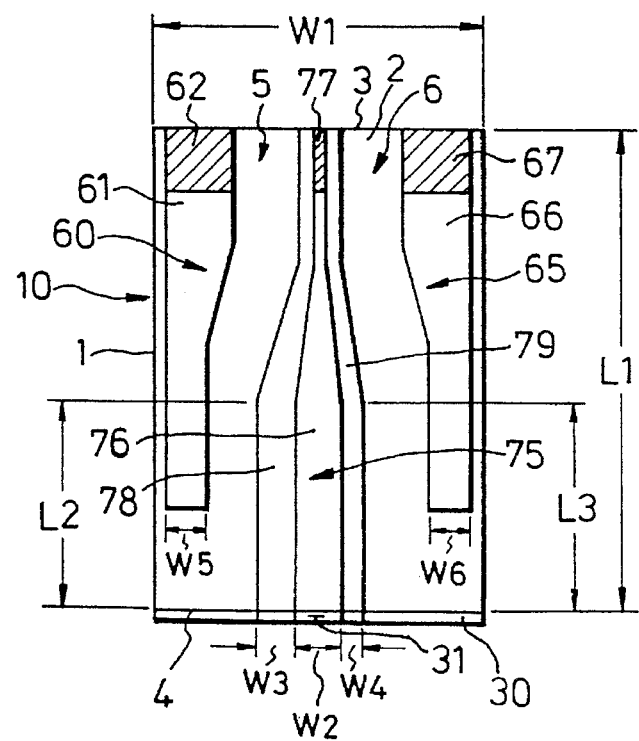
FIG. 10B is a plan view of the magnetic head shown in FIG. 10A seen from the magnetic disk.

FIG. 10A is a perspective view of a magnetic head having a magnetic head slider of a fourth embodiment of the present invention. FIG. 10B is a plan view of the magnetic head shown in FIG. 10A seen from the magnetic disk.

In this fourth embodiment, the same components and parts as those of the third embodiment are designated by the same numerals and the corresponding descriptions similarly apply. Therefore, the descriptions will be made mainly on the difference of the fourth embodiment from the third embodiment.

In FIG. 10A and FIG. 10B, a third rail 75 is provided on the surface 2 between the first rail 60 and the second rail 65 so as to extend from the front end 8 to the rear end 4.

The third rail 75 comprises a third air bearing surface 76, a third tapered part 77, a first air pressurization part 78 and a second air pressurization part 79. The third air bearing surface 78, the first air pressurization part 78 and the second air pressurization part 79 are formed parallel with each other. The third tapered part 77 is formed with the predetermined angle to the third air bearing surface The first air pressurization part 78 is sunk by a first depth "D1" from the third air bearing surface 76, and the second air pressurization part 79 is sunk by a second depth "D2" from the third air bearing surface A width of the third rail 75 at the side of the Front end 3 is smaller than a width thereof at the side of the rear end 4. Similarly, in the third air bearing surface 76, the first air pressurization part 78 and the second air pressurization part 79, widths at the side of the front end 3 are smaller than widths at the side of the rear end 4, respectively.

A first slot part 5 is formed between the first rail 60 and the third rail 75 in the surface 2, and a second slot part 6 is formed between the second rail 65 and the third rail 75 in the surface 2.

In this fourth embodiment, since the third tapered part 77 is formed at the front end 3, even if the slider 1 come in contact with the magnetic disk, the third rail 75 hardly injures the magnetic disk.

Furthermore, since a width of the third air bearing surface 76 at the side of the front end 3 is smaller than a width of the third air bearing surface 76 at the side of the rear end 4, the third air bearing surface 76 has only small lifting force near the side of the front end 3. Therefore, the flying height is stable against pitching and rolling of the slider 1.

Apart from the aforementioned explanation, where the width of the third rail 75 at the side of the front end 3 is smaller than the width of the third rail 75 at the side of the rear end 4, an alternative configuration may be such that the width of the third rail 75 at the side of the front end 3 is equal to the width of the third rail 75 at the side of the rear end 4.

A MODIFIED VERSION OF THE FOURTH EXAMPLE

Figure 11A:
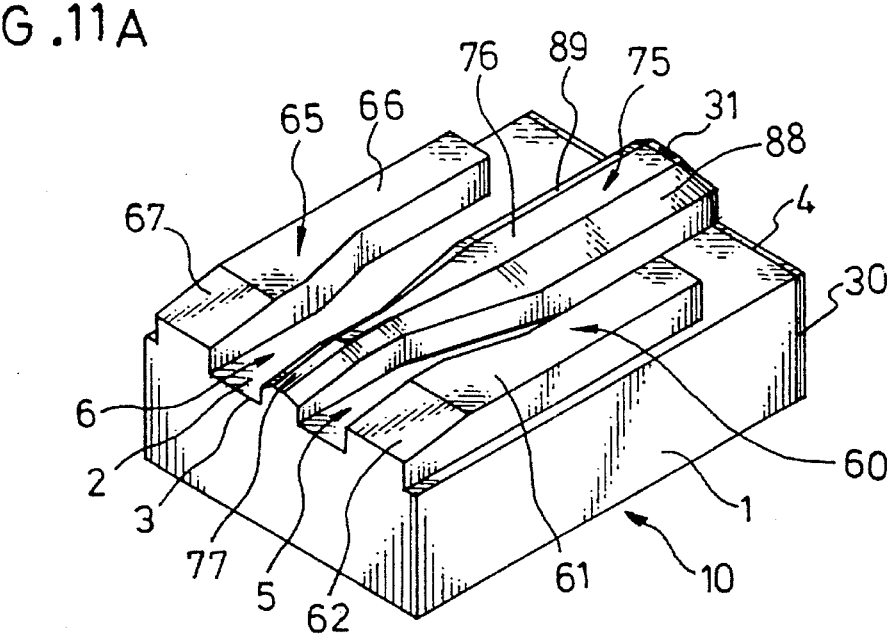
FIG. 11A is a perspective view of a magnetic head having a magnetic head slider which is a modified version of the fourth embodiment of the present invention.
Figure 11B:
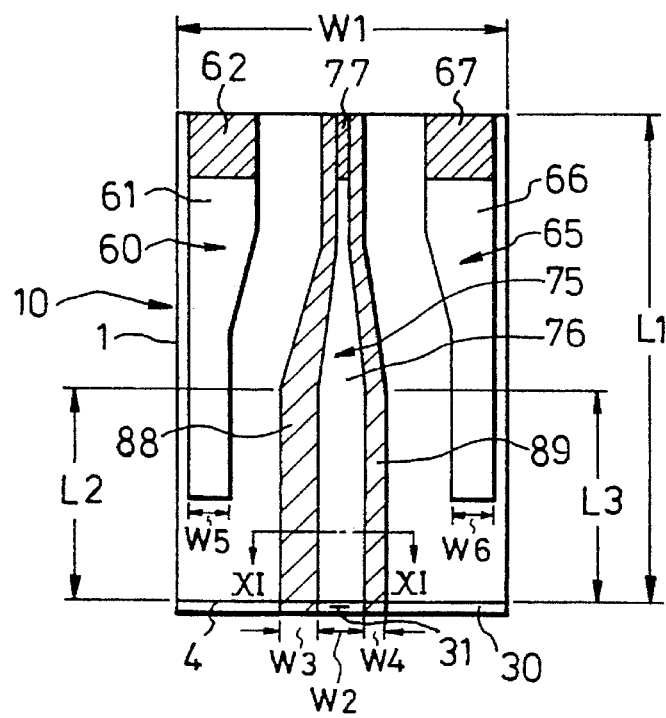
FIG. 11B is a plan view of the magnetic head shown in FIG. 11A seen from the magnetic disk.
Figure 11C:
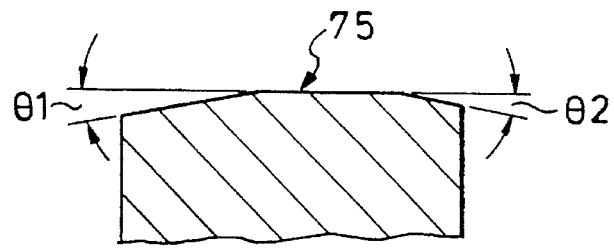
FIG. 11C is a partial cross sectional view taken on line XI—XI in FIG. 11B showing the third rail.

A modified version of the fourth example will be explained with reference to FIG. 11A, FIG. 11B and FIG. 11C. FIG. 11A is a perspective view of a magnetic head having a magnetic head slider which is a modified version of the fourth embodiment of the present invention. FIG. 11B is a plan view of the magnetic head shown in FIG. 11A seen from the magnetic disk. FIG. 11C is a partial cross sectional view taken on line XI—XI in FIG. 11B showing a third rail. In this modified version, the same components and parts as those of the fourth embodiment are designated by the same numerals and the corresponding descriptions similarly apply. Therefore, the descriptions will be made mainly on the modified parts from the fourth embodiment.

In FIG. 11A, FIG. 11B and FIG. 11C, the third rail 75 comprises the third air bearing surface 76, the first air pressurization part 88, the second air pressurization part 89 and the third tapered part 77. Furthermore, the first air pressurization part 88 is formed into a tapered shape with a first angle "θ1" to the third air bearing surface 76, and the second air pressurization part 89 is formed into a tapered shape with a second angle "θ2" to the third air bearing surface 76. It is preferred that the first and second angles "θ1" and "θ2" are less than 2 degree angle.

As above-mentioned, since the first and the second air pressurization parts 88 and 89 are formed into the tapered shape, when the skew angle "θ" changes from zero degree angle to some value, the air flow is pressurized smoothly.

FIFTH EXAMPLE

Figure 12A:
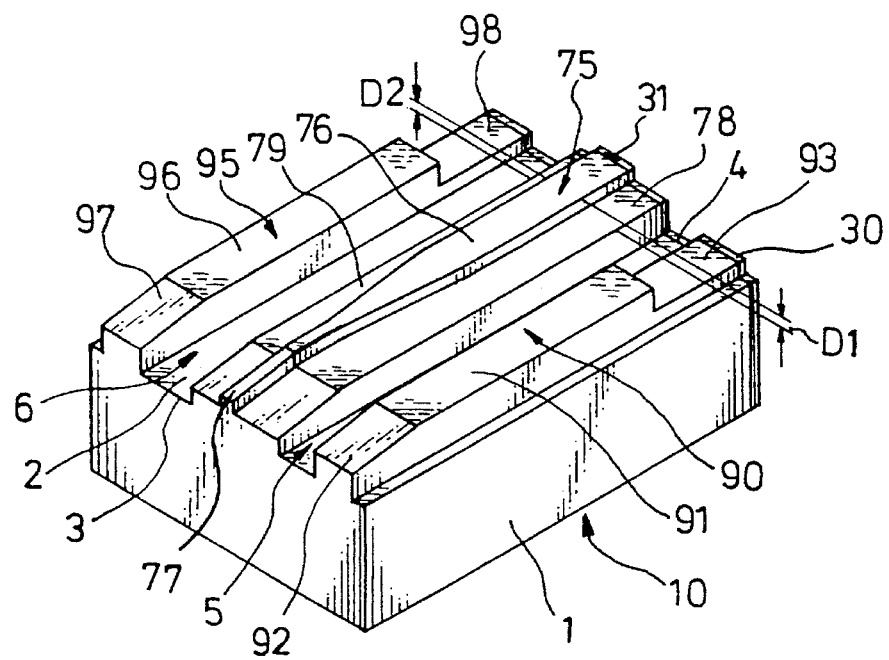
FIG. 12A is a perspective view of a magnetic head having a magnetic head slider of a fifth embodiment of the present invention.
Figure 12B:
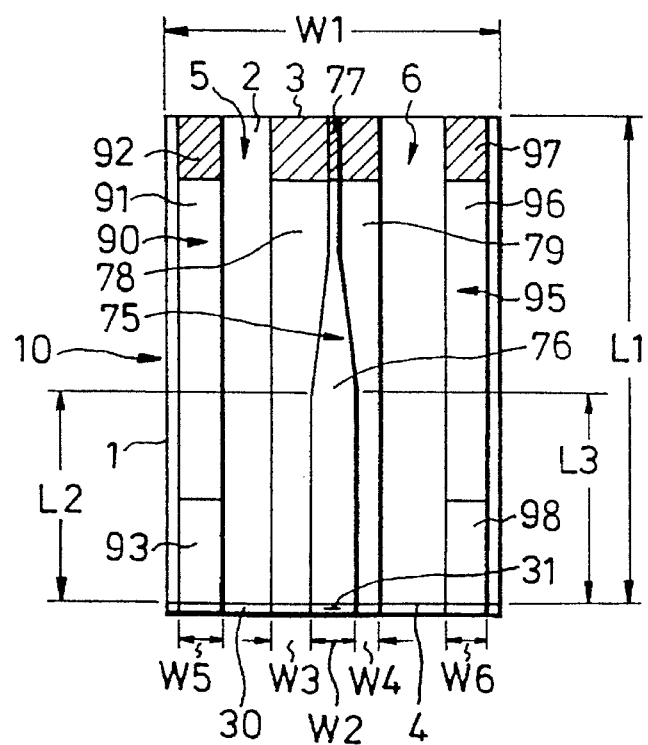
FIG. 12B is a plan view of the magnetic head shown in FIG. 12A seen from the magnetic disk.

FIG. 12A is a perspective view of a magnetic head having a magnetic head slider of a fifth embodiment of the present invention. FIG. 12B is a plan view of the magnetic head shown in FIG. 12A seen from the magnetic disk.

In this fifth embodiment, the same components and parts as those of the fourth embodiment are designated by the same numerals and the corresponding descriptions similarly apply. Therefore, the descriptions will be made mainly on the difference of the fifth embodiment from the fourth embodiment.

In FIG. 12A and FIG. 12B, a first rail 90 and a second rail 95 are provided on a surface 2, which faces to the magnetic disk with a predetermined pitch angle, so as to extend from a front end 3 of the surface 2 to a rear end 4 of the surface 2, respectively.

The first rail 90 comprises a first air bearing surface 91, a first tapered part 92 having the predetermined angle to the first air bearing surface 91 and a first step part 93 having a third depth "D3" with respect to the first air bearing surface 91 in a direction from the first air bearing surface 91 to the surface 2. Similarly, the second rail 95 comprises a second air bearing surface 96, a second tapered part 97 having the predetermined angle to the second air bearing surface 96 and a second step part 98 having a fourth depth "D4" with respect to the second air bearing surface 96 in a direction from the second air bearing surface 96 to the surface 2. The third and the fourth depths "D3" and "D4" shown in FIG. 12A are between 0.1 μm and 4 μm.

In this fifth embodiment, negative pressure forces are given to the slider 1 at the first and the second step parts 93 and 98. Thereby, stiffness of the air film is improved. Accordingly, a high stability against rolling and pitching is further achieved.

A MODIFIED VERSION OF THE FIFTH EXAMPLE

Figure 13A:
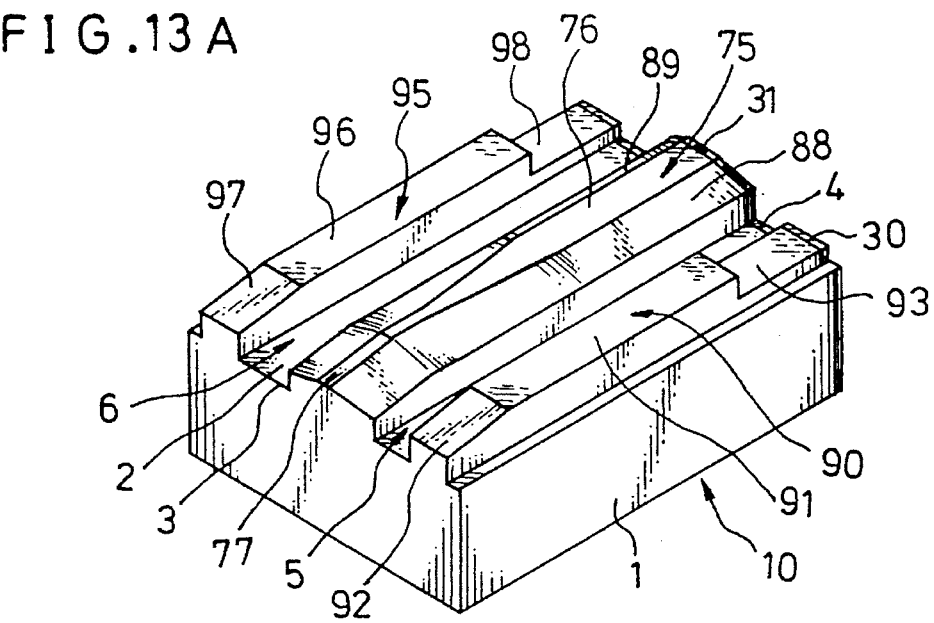
FIG. 13A is a perspective view of a magnetic head having a magnetic head slider which is a modified version of the fifth embodiment of the present invention.
Figure 13B:
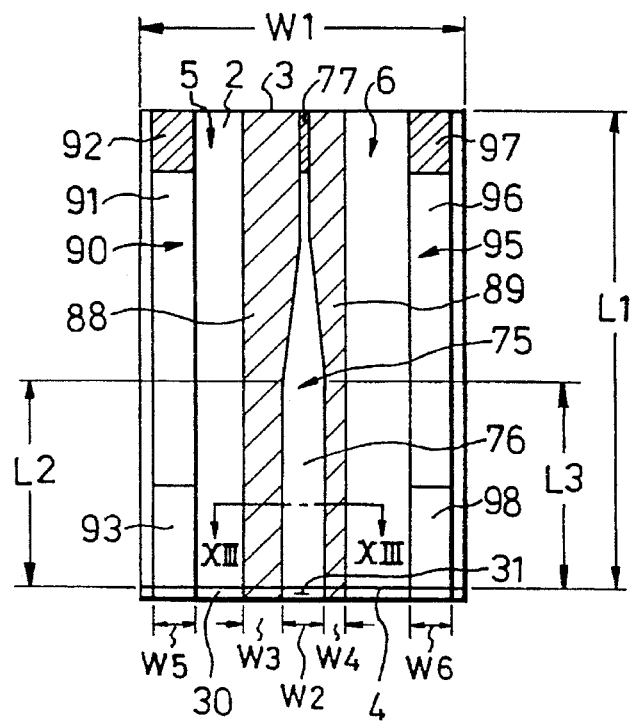
FIG. 13B is a plan view of the magnetic head shown in FIG. 13A seen from the magnetic disk.
Figure 13C:
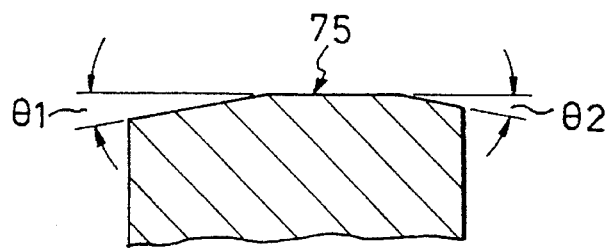
FIG. 13C is a partial cross sectional view taken on line XIII—XIII in FIG. 13B showing the third rail.

A modified version of the fourth example will be explained with reference to FIG. 13A, FIG. 13B and FIG. 13C. FIG. 13A is a perspective view of a magnetic head having a magnetic head slider which is a modified version of the fifth embodiment of the present invention. FIG. 13B is a plan view of the magnetic head shown in FIG. 13A seen from the magnetic disk. FIG. 13C is a partial cross sectional view taken on line XIII—XIII in FIG. 13B showing a third rail. In this modified version, the same components and parts as those of the fifth embodiment are designated by the same numerals and the corresponding descriptions similarly apply. Therefore, the descriptions will be made mainly on the modified parts from the fifth embodiment.

In FIG. 13A, FIG. 13B and FIG. 13C, the third rail 75 comprises the third air bearing surface 76, the first air pressurization part 88, the second air pressurization part 89 and the third tapered part 77. Furthermore, the first air pressurization part 88 is formed into a tapered shape with a first angle "θ1" to the third air bearing surface 76, and the second air pressurization part 89 is formed into a tapered shape with a second angle "θ2" to the third air bearing surface 76. The first and second angles "θ1" and "θ2" are preferably less than 2 degree angle.

As above-mentioned, since the first and the second air pressurization parts 88 and 89 are formed into the tapered shape, when the skew angle "θ" changes from zero degree angle to some value, the air flow is pressurized smoothly.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A magnetic head slider comprising:

a surface having a front end, a rear end, and two side edges, said surface having a full length between the front end and the rear end, said surface for facing to a magnetic disk with a predetermined pitch angle, a first rail having a first air bearing surface, the first rail being disposed on said surface along one of said side edges and extending from said front end of said surface toward said rear end of said surface, a second rail having a second air bearing surface, the second rail being disposed on said surface along a remaining one of said two side edges and extending from said front end toward said rear end, wherein each of the first and second rails extend over a length less than the full length; and a third rail having a third air bearing surface, the third rail being disposed on said surface between said first rail and said second rail, said third air bearing surface being disposed between a first air pressurization part and a second air pressurization part, wherein said first air pressurization part and said second air pressurization part are sunk by a same depth from said third air bearing surface, and a width of said first air pressurization part is larger than a width of said second pressurization part.

2. A magnetic head slider in accordance with claim 1, wherein said third rail is disposed on said surface and extends from an intermediate part of said surface to said rear end.

3. A magnetic head slider in accordance with claim 1, wherein said third rail is disposed on said surface and extends from said front end to said rear end.

4. A magnetic head slider in accordance with claim 1, wherein said first air pressurization part and said second air pressurization part are formed parallel with said air bearing surface.

5. A magnetic head slider in accordance with claim 1, wherein said depth is between 0.1 μm and 4.0 μm.

6. A magnetic head slider in accordance with claim 1, wherein said first air pressurization part and said second air pressurization part are formed into a tapered shape with an angle to said third air bearing surface.

7. A magnetic head slider in accordance with claim 6, wherein said angle is less than 2 degrees.

8. A magnetic head slider in accordance with claim 1, wherein said third rail includes a semi-cylindrical part at an end of said third rail proximate said front end and each said first and said second air pressurization parts includes at least one inclined edge proximate said front end.

9. A magnetic head slider in accordance with claim 1, wherein said first rail includes a first step part extending from an end of said first rail to said rear end of said surface; and said second rail includes a second step part extending from an end of said second rail to said rear end of said surface.

10. A magnetic head slider in accordance with claim 1, further comprising:

a magnetic transducer having a magnetic gap, said magnetic gap being fixed at said rear end of said surface such that said magnetic gap is substantially coplanar with said third air bearing surface.

* * * * *